United States Patent
Taylor

(10) Patent No.: US 10,086,542 B2
(45) Date of Patent: Oct. 2, 2018

(54) METHOD FOR MOLDING THREE-DIMENSIONAL FOAM PRODUCTS USING A CONTINUOUS FORMING APPARATUS

(71) Applicant: Century-Board USA, LLC, Mooresville, NC (US)

(72) Inventor: Zachary R Taylor, Murrieta, CA (US)

(73) Assignee: CENTURY-BOARD USA, LLC, Mooresville, NC (US)

( * ) Notice: Subject to any disclaimer, the term of this patent is extended or adjusted under 35 U.S.C. 154(b) by 0 days.

(21) Appl. No.: 15/424,397

(22) Filed: Feb. 3, 2017

(65) Prior Publication Data

US 2017/0144338 A1    May 25, 2017

Related U.S. Application Data

(63) Continuation of application No. 15/213,275, filed on Jul. 18, 2016, which is a continuation of application
(Continued)

(51) Int. Cl.
*B29C 67/20* (2006.01)
*B29C 44/30* (2006.01)
(Continued)

(52) U.S. Cl.
CPC ........ *B29C 44/306* (2013.01); *B29C 37/0075* (2013.01); *B29C 44/585* (2013.01); *B29K 2105/04* (2013.01)

(58) Field of Classification Search
CPC ..... B29C 44/306; B29C 44/302; B29C 44/30; B29C 44/203; B29C 44/28; B29C 44/285;
(Continued)

(56) References Cited

U.S. PATENT DOCUMENTS 529,535 A    11/1894    Smith
529,538 A    11/1894    Vaughn
(Continued)

FOREIGN PATENT DOCUMENTS

CA    2 037 130    1/2006
CN    1251596      4/2000
(Continued)

OTHER PUBLICATIONS

"Achieving a Wood Grain Finish Effect," Dec. 11, 2003, http://www.sculpt.com/technogtes/woodgrainfinish.htm.
(Continued)

*Primary Examiner* — Stella K Yi
(74) *Attorney, Agent, or Firm* — Knobbe, Martens, Olson & Bear, LLP

(57) ABSTRACT

A continuous forming apparatus for molding foam material into foam products that includes a first endless belt and a second endless belt that cooperates with the first endless belt to mold the foam material. The continuous forming apparatus may also include a first plurality of cleats and a second plurality of cleats opposed to the first plurality of cleats that support the first endless belt and the second endless belt respectively. The first plurality of cleats may include a three-dimensional abutment surface that provides transverse and lateral support to the first endless belt. Additionally, the continuous forming apparatus may include a first frame disposed to support the first plurality of cleats, a second frame disposed to support the second plurality of cleats, and a drive mechanism for imparting motion to the first endless belt, the second endless belt, the first plurality of cleats, and the second plurality of cleats.

19 Claims, 10 Drawing Sheets

Related U.S. Application Data

No. 14/967,052, filed on Dec. 11, 2015, now abandoned, which is a continuation of application No. 14/180,630, filed on Feb. 14, 2014, now abandoned, which is a continuation of application No. 13/681,222, filed on Nov. 19, 2012, now abandoned, which is a continuation of application No. 13/366,136, filed on Feb. 3, 2012, now abandoned, which is a continuation of application No. 12/692,241, filed on Jan. 22, 2010, now abandoned, which is a continuation of application No. 11/593,316, filed on Nov. 6, 2006, now Pat. No. 7,651,645, which is a continuation of application No. 11/165,071, filed on Jun. 23, 2005, now Pat. No. 7,316,559.

(60) Provisional application No. 60/582,420, filed on Jun. 24, 2004.

(51) Int. Cl.
*B29C 44/58* (2006.01)
*B29C 37/00* (2006.01)
*B29K 105/04* (2006.01)

(58) Field of Classification Search
CPC ......... B29C 39/16; B29C 41/28; B29C 43/06; B29C 44/304; B29C 53/043; B29C 53/74; B29C 59/04; B29C 66/83423
See application file for complete search history.

(56) References Cited

U.S. PATENT DOCUMENTS

| | | | |
|---|---|---|---|
| 2,526,033 | A | 10/1950 | Lyon |
| 2,817,875 | A | 12/1957 | Harris et al. |
| 2,983,693 | A | 5/1961 | Sievers |
| 3,065,500 | A | 11/1962 | Berner |
| 3,071,297 | A | 1/1963 | Lee |
| 3,078,512 | A | 2/1963 | De Haven |
| 3,223,027 | A | 12/1965 | Soda et al. |
| 3,262,151 | A | 7/1966 | Oxel |
| 3,269,961 | A | 8/1966 | Bruson et al. |
| 3,308,218 | A | 3/1967 | Wiegand et al. |
| 3,466,705 | A | 9/1969 | Richie |
| 3,528,126 | A | 9/1970 | Ernst et al. |
| 3,566,448 | A | 3/1971 | Ernst |
| 3,644,168 | A | 2/1972 | Bonk et al. |
| 3,698,731 | A | 10/1972 | Jost et al. |
| 3,726,624 | A | 4/1973 | Schwarz |
| 3,736,081 | A | 5/1973 | Yovanvich |
| 3,738,895 | A | 6/1973 | Paymal |
| 3,764,247 | A | 10/1973 | Garrett et al. |
| 3,768,937 | A | 10/1973 | Haga et al. |
| 3,774,428 | A | 11/1973 | Derry et al. |
| 3,802,582 | A | 4/1974 | Brock |
| 3,816,043 | A | 6/1974 | Snelling et al. |
| 3,819,574 | A | 6/1974 | Brown et al. |
| 3,824,057 | A | 7/1974 | Kornylak et al. |
| 3,830,776 | A | 8/1974 | Carlson et al. |
| 3,832,429 | A | 8/1974 | Charpentier |
| 3,841,390 | A | 10/1974 | DiBenedetto et al. |
| 3,843,757 | A | 10/1974 | Ehrenfreund |
| 3,852,387 | A | 12/1974 | Bortnick et al. |
| 3,867,494 | A | 2/1975 | Rood et al. |
| 3,878,027 | A | 4/1975 | Troutner |
| 3,890,077 | A | 6/1975 | Holman |
| 3,910,179 | A | 10/1975 | Troutner |
| 3,914,084 | A * | 10/1975 | Kornylak ............ B29C 44/302 425/224 |
| 3,917,547 | A | 11/1975 | Massey |
| 3,917,774 | A | 11/1975 | Sagane et al. |
| 3,928,258 | A | 12/1975 | Alexander |
| 3,963,697 | A | 6/1976 | Ullrich et al. |
| 3,981,654 | A | 9/1976 | Rood et al. |
| 3,991,005 | A | 11/1976 | Wallace |
| 3,999,230 | A | 12/1976 | Bruning et al. |
| 4,005,035 | A | 1/1977 | Deaver |
| 4,042,314 | A | 8/1977 | Bruning et al. |
| 4,051,742 | A | 10/1977 | Johansson et al. |
| 4,060,579 | A | 11/1977 | Schmitzer et al. |
| 4,065,410 | A | 12/1977 | Schafer et al. |
| 4,073,840 | A | 2/1978 | Saidla |
| 4,078,032 | A | 3/1978 | Wenner |
| 4,092,276 | A | 5/1978 | Narayan |
| 4,104,094 | A | 8/1978 | Peterson |
| 4,107,248 | A | 8/1978 | Schlieckmann |
| 4,120,626 | A | 10/1978 | Keller |
| 4,127,040 | A | 11/1978 | Moore et al. |
| 4,128,369 | A | 12/1978 | Kemerer |
| 4,137,200 | A | 1/1979 | Wood et al. |
| 4,141,862 | A | 2/1979 | Raden |
| 4,143,759 | A | 3/1979 | Paradis |
| 4,149,840 | A | 4/1979 | Tippmann |
| 4,153,768 | A | 5/1979 | Blount |
| 4,160,749 | A | 7/1979 | Schneider et al. |
| 4,163,824 | A | 8/1979 | Saidla |
| 4,164,439 | A | 8/1979 | Coonrod |
| 4,164,526 | A | 8/1979 | Clay et al. |
| 4,165,414 | A | 8/1979 | Narayan et al. |
| 4,180,538 | A | 12/1979 | Morikawa et al. |
| 4,209,605 | A | 6/1980 | Hoy et al. |
| 4,210,572 | A | 7/1980 | Herman et al. |
| 4,214,864 | A | 7/1980 | Tabler |
| 4,221,877 | A | 9/1980 | Cuscurida et al. |
| 4,243,755 | A | 1/1981 | Marx et al. |
| 4,247,656 | A | 1/1981 | Janssen |
| 4,248,975 | A | 2/1981 | Satterly |
| 4,251,428 | A | 2/1981 | Recker et al. |
| 4,254,002 | A | 3/1981 | Sperling et al. |
| 4,254,176 | A | 3/1981 | Müller et al. |
| 4,256,846 | A | 3/1981 | Ohasi et al. |
| 4,260,538 | A | 4/1981 | Iseler et al. |
| 4,261,946 | A | 4/1981 | Goyert et al. |
| 4,272,377 | A | 6/1981 | Gerlach et al. |
| 4,275,033 | A | 6/1981 | Schulte et al. |
| 4,276,337 | A | 6/1981 | Coonrod |
| 4,282,988 | A | 8/1981 | Hulber, Jr. |
| 4,290,248 | A * | 9/1981 | Kemerer ............ B29C 43/222 264/167 |
| 4,300,776 | A | 11/1981 | Taubenmann |
| 4,330,494 | A | 5/1982 | Iwata et al. |
| 4,331,726 | A | 5/1982 | Cleary |
| 4,338,422 | A | 7/1982 | Jackson, Jr. et al. |
| 4,339,366 | A | 7/1982 | Blount |
| 4,342,847 | A | 8/1982 | Goyert et al. |
| 4,344,873 | A | 8/1982 | Wick |
| 4,347,281 | A | 8/1982 | Futcher et al. |
| 4,359,359 | A | 11/1982 | Gerlach et al. |
| 4,359,548 | A | 11/1982 | Blount |
| 4,366,204 | A | 12/1982 | Briggs |
| 4,367,259 | A | 1/1983 | Fulmer et al. |
| 4,376,171 | A | 3/1983 | Blount |
| 4,381,352 | A | 4/1983 | McBrayer |
| 4,382,056 | A | 5/1983 | Coonrod |
| 4,383,818 | A | 5/1983 | Swannell |
| 4,390,581 | A | 6/1983 | Cogswell et al. |
| 4,395,214 | A | 7/1983 | Phipps et al. |
| 4,396,791 | A | 8/1983 | Mazzoni |
| 4,397,983 | A | 8/1983 | Hill et al. |
| 4,412,033 | A | 10/1983 | LaBelle et al. |
| 4,439,548 | A | 3/1984 | Weisman |
| 4,450,133 | A | 5/1984 | Cafarelli |
| 4,460,737 | A | 7/1984 | Evans et al. |
| 4,465,500 | A | 8/1984 | Motsinger et al. |
| 4,483,727 | A | 11/1984 | Eickman |
| 4,489,023 | A | 12/1984 | Proksa |
| 4,512,942 | A | 4/1985 | Babbin et al. |
| 4,514,162 | A | 4/1985 | Schulz |
| 4,532,098 | A | 7/1985 | Campbell et al. |
| 4,540,357 | A | 9/1985 | Campbell et al. |
| 4,568,702 | A | 2/1986 | Mascioli |
| 4,576,718 | A | 3/1986 | Reischl et al. |
| 4,581,186 | A | 4/1986 | Larson |

(56) References Cited

U.S. PATENT DOCUMENTS

| | | |
|---|---|---|
| 4,595,709 A | 6/1986 | Reischl |
| 4,597,927 A | 7/1986 | Zeitler et al. |
| 4,600,311 A | 7/1986 | Mourrier |
| 4,604,410 A | 8/1986 | Altenberg |
| 4,649,162 A | 3/1987 | Roche et al. |
| 4,661,533 A | 4/1987 | Stobby |
| 4,677,157 A | 6/1987 | Jacobs |
| 4,680,214 A | 7/1987 | Frisch et al. |
| 4,714,778 A | 12/1987 | Burgoyne, Jr. et al. |
| 4,717,027 A | 1/1988 | Laure et al. |
| 4,780,484 A | 10/1988 | Schubert et al. |
| 4,780,498 A | 10/1988 | Goerrissen et al. |
| 4,795,763 A | 1/1989 | Gluck et al. |
| 4,802,769 A | 2/1989 | Tanaka |
| 4,826,944 A | 5/1989 | Hoefer et al. |
| 4,832,183 A | 5/1989 | Lapeyre |
| 4,835,195 A | 5/1989 | Rayfield et al. |
| 4,855,184 A | 8/1989 | Klun et al. |
| 4,892,891 A | 1/1990 | Close |
| 4,895,352 A | 1/1990 | Stumpf |
| 4,948,859 A | 8/1990 | Echols et al. |
| 4,995,801 A | 2/1991 | Hehl |
| 5,001,165 A | 3/1991 | Canaday et al. |
| 5,010,112 A | 4/1991 | Glicksman et al. |
| 5,028,648 A | 7/1991 | Famili et al. |
| 5,051,222 A | 9/1991 | Marten et al. |
| 5,053,274 A | 10/1991 | Jonas |
| 5,091,436 A | 2/1992 | Frisch et al. |
| 5,094,798 A | 3/1992 | Hewitt |
| 5,096,993 A | 3/1992 | Smith et al. |
| 5,102,918 A | 4/1992 | Moriya |
| 5,102,969 A | 4/1992 | Scheffler et al. |
| 5,114,630 A | 5/1992 | Newman et al. |
| 5,149,722 A | 9/1992 | Soukup |
| 5,149,739 A | 9/1992 | Lee |
| 5,159,012 A | 10/1992 | Doesburg et al. |
| 5,166,301 A | 11/1992 | Jacobs |
| 5,167,899 A | 12/1992 | Jezic |
| 5,185,420 A | 2/1993 | Smith et al. |
| 5,229,138 A | 7/1993 | Carotti |
| 5,252,697 A | 10/1993 | Jacobs et al. |
| 5,271,699 A | 12/1993 | Barre |
| 5,296,545 A | 3/1994 | Heise |
| 5,300,531 A | 4/1994 | Weaver |
| 5,302,634 A | 4/1994 | Mushovic |
| 5,330,341 A * | 7/1994 | Kemerer ............... B29C 35/16 100/151 |
| 5,331,044 A | 7/1994 | Lausberg et al. |
| 5,340,300 A | 8/1994 | Saeki et al. |
| 5,344,490 A | 9/1994 | Roosen et al. |
| 5,361,945 A | 11/1994 | Johanson |
| 5,369,147 A | 11/1994 | Mushovic |
| 5,375,988 A | 12/1994 | Klahre |
| 5,424,013 A | 6/1995 | Lieberman |
| 5,424,014 A | 6/1995 | Glorioso et al. |
| 5,432,204 A | 7/1995 | Farkas |
| 5,439,711 A | 8/1995 | Vu et al. |
| 5,453,231 A | 9/1995 | Douglas |
| 5,455,312 A | 10/1995 | Heidingsfeld et al. |
| 5,458,477 A | 10/1995 | Kemerer et al. |
| 5,491,174 A | 2/1996 | Grier et al. |
| 5,495,640 A | 3/1996 | Mullet et al. |
| 5,505,599 A | 4/1996 | Kemerer et al. |
| 5,508,315 A | 4/1996 | Mushovic |
| 5,522,446 A | 6/1996 | Mullet et al. |
| 5,527,172 A | 6/1996 | Graham, Jr. |
| 5,532,065 A | 7/1996 | Gübitz et al. |
| 5,536,781 A | 7/1996 | Heidingsfeld et al. |
| 5,554,713 A | 9/1996 | Freeland |
| 5,562,141 A | 10/1996 | Mullet et al. |
| 5,565,497 A | 10/1996 | Godbey et al. |
| 5,566,740 A | 10/1996 | Mullet et al. |
| 5,567,791 A | 10/1996 | Brauer et al. |
| 5,569,713 A | 10/1996 | Lieberman |
| 5,582,840 A | 12/1996 | Pauw et al. |
| 5,582,849 A | 12/1996 | Lupke |
| 5,604,266 A | 2/1997 | Mushovic |
| 5,611,976 A | 3/1997 | Klier et al. |
| 5,621,024 A | 4/1997 | Eberhardt et al. |
| 5,631,103 A | 5/1997 | Eschbach et al. |
| 5,631,319 A | 5/1997 | Reese et al. |
| 5,643,516 A | 7/1997 | Raza et al. |
| 5,681,915 A | 10/1997 | Lechner et al. |
| 5,688,890 A | 11/1997 | Ishiguro et al. |
| 5,696,205 A | 12/1997 | Müller et al. |
| 5,700,495 A | 12/1997 | Kemerer et al. |
| 5,723,506 A | 3/1998 | Glorioso et al. |
| 5,728,337 A | 3/1998 | Yoshikawa et al. |
| 5,759,695 A | 6/1998 | Primeaux, II |
| 5,760,133 A | 6/1998 | Heidingsfeld et al. |
| 5,782,283 A | 7/1998 | Kendall |
| 5,783,125 A | 7/1998 | Bastone et al. |
| 5,783,629 A | 7/1998 | Srinivasan et al. |
| 5,795,949 A | 8/1998 | Daute et al. |
| 5,811,506 A | 9/1998 | Slagel |
| 5,817,402 A | 10/1998 | Miyake et al. |
| 5,836,499 A | 11/1998 | Mullet et al. |
| 5,844,015 A | 12/1998 | Steilen et al. |
| 5,908,701 A | 6/1999 | Jennings et al. |
| 5,929,153 A | 7/1999 | Mori et al. |
| 5,934,352 A | 8/1999 | Morgan |
| 5,945,460 A | 8/1999 | Ekart et al. |
| 5,952,053 A | 9/1999 | Colby |
| 5,962,144 A | 10/1999 | Primeaux, II |
| 5,981,655 A | 11/1999 | Heidingsfeld et al. |
| 6,000,102 A | 12/1999 | Lychou |
| 6,019,269 A | 2/2000 | Mullet et al. |
| 6,020,387 A | 2/2000 | Downey et al. |
| 6,040,381 A | 3/2000 | Jennings et al. |
| 6,051,634 A | 4/2000 | Laas et al. |
| 6,055,781 A | 5/2000 | Johanson |
| 6,062,719 A | 5/2000 | Busby et al. |
| 6,086,802 A | 7/2000 | Levera et al. |
| 6,096,401 A | 8/2000 | Jenkines |
| 6,103,340 A | 8/2000 | Kubo et al. |
| 6,107,355 A | 8/2000 | Horn et al. |
| 6,107,433 A | 8/2000 | Petrovic et al. |
| 6,120,905 A | 9/2000 | Flgovsky |
| 6,136,246 A | 10/2000 | Rauwendaal et al. |
| 6,136,870 A | 10/2000 | Triolo et al. |
| 6,140,381 A | 10/2000 | Rosthauser et al. |
| 6,177,232 B1 | 1/2001 | Melisaris et al. |
| 6,180,192 B1 | 1/2001 | Smith et al. |
| 6,180,686 B1 | 1/2001 | Kurth |
| RE37,095 E | 3/2001 | Glorioso et al. |
| 6,204,312 B1 | 3/2001 | Taylor |
| 6,211,259 B1 | 4/2001 | Borden et al. |
| 6,224,797 B1 | 5/2001 | Franzen et al. |
| 6,234,777 B1 | 5/2001 | Sperry et al. |
| 6,252,031 B1 | 6/2001 | Tsutsumi et al. |
| 6,257,643 B1 | 7/2001 | Young |
| 6,257,644 B1 | 7/2001 | Young |
| 6,258,310 B1 | 7/2001 | Sardanopoli et al. |
| 6,258,917 B1 | 7/2001 | Slagel |
| 6,264,462 B1 | 7/2001 | Gallagher |
| 6,284,841 B1 | 9/2001 | Friesner |
| 6,294,637 B1 | 9/2001 | Braüer et al. |
| 6,297,321 B1 | 10/2001 | Onder et al. |
| 6,309,507 B1 | 10/2001 | Morikawa et al. |
| 6,312,244 B1 | 11/2001 | Levera et al. |
| 6,321,904 B1 | 11/2001 | Mitchell |
| 6,329,448 B1 | 12/2001 | Gutsche et al. |
| 6,343,924 B1 | 2/2002 | Klepsch |
| 6,348,514 B1 | 2/2002 | Calabrese et al. |
| 6,383,599 B1 | 5/2002 | Bell et al. |
| 6,387,504 B1 | 5/2002 | Mushovic |
| 6,409,949 B1 | 6/2002 | Tatsuya et al. |
| 6,429,257 B1 | 8/2002 | Buxton et al. |
| 6,432,335 B1 | 8/2002 | Ladang et al. |
| 6,433,032 B1 | 8/2002 | Hamilton |
| 6,433,121 B1 | 8/2002 | Petrovic et al. |
| 6,455,605 B1 | 9/2002 | Giorgini et al. |
| 6,455,606 B1 | 9/2002 | Kaku et al. |
| 6,458,866 B1 | 10/2002 | Oppermann et al. |

(56) References Cited

U.S. PATENT DOCUMENTS

| | | |
|---|---|---|
| 6,465,569 B1 | 10/2002 | Kurth |
| 6,467,610 B1 | 10/2002 | MacLachlan |
| 6,469,667 B2 | 10/2002 | Fox et al. |
| 6,485,665 B1 | 11/2002 | Hermanutz et al. |
| 6,534,617 B1 | 3/2003 | Batt et al. |
| 6,541,534 B2 | 4/2003 | Allen et al. |
| 6,552,660 B1 | 4/2003 | Lisowski |
| 6,555,199 B1 | 4/2003 | Jenkines |
| 6,571,935 B1 | 6/2003 | Campbell et al. |
| 6,573,309 B1 | 6/2003 | Reitenbach et al. |
| 6,573,354 B1 | 6/2003 | Petrovic et al. |
| 6,578,619 B2 | 6/2003 | Wright |
| 6,579,932 B1 | 6/2003 | Schipper et al. |
| 6,604,848 B2 | 8/2003 | Tanaka et al. |
| 6,605,343 B1 | 8/2003 | Motoi et al. |
| 6,613,827 B2 | 9/2003 | Lundgard et al. |
| 6,616,886 B2 | 9/2003 | Peterson et al. |
| 6,617,009 B1 | 9/2003 | Chen et al. |
| 6,624,244 B2 | 9/2003 | Kurth |
| 6,641,384 B2 | 11/2003 | Bosler et al. |
| 6,649,084 B2 | 11/2003 | Morikawa et al. |
| 6,649,667 B2 | 11/2003 | Clatty |
| 6,686,435 B1 | 2/2004 | Petrovic et al. |
| 6,695,902 B2 | 2/2004 | Hemmings et al. |
| 6,706,774 B2 | 3/2004 | Münzenberger et al. |
| 6,767,399 B2 | 7/2004 | Peev et al. |
| 6,769,220 B2 | 8/2004 | Friesner |
| 6,832,430 B1 | 12/2004 | Ogawa et al. |
| 6,849,676 B1 | 2/2005 | Shibano et al. |
| 6,864,296 B2 | 3/2005 | Kurth |
| 6,867,239 B2 | 3/2005 | Kurth |
| 6,871,457 B2 | 3/2005 | Quintero-Flores et al. |
| 6,881,763 B2 | 4/2005 | Kurth |
| 6,881,764 B2 | 4/2005 | Doesburg et al. |
| 6,903,156 B2 | 6/2005 | Müller et al. |
| 6,908,573 B2 | 6/2005 | Hossan |
| 6,916,863 B2 | 7/2005 | Hemmings et al. |
| 6,962,636 B2 | 11/2005 | Kurth et al. |
| 6,971,495 B2 | 12/2005 | Hedrick et al. |
| 6,979,477 B2 | 12/2005 | Kurth et al. |
| 6,979,704 B1 | 12/2005 | Mayer et al. |
| 6,989,123 B2 | 1/2006 | Lee et al. |
| 6,997,346 B2 | 2/2006 | Landers et al. |
| 7,063,877 B2 | 6/2006 | Kurth et al. |
| 7,132,459 B1 | 11/2006 | Buchel |
| 7,160,976 B2 | 1/2007 | Lühmann et al. |
| 7,188,992 B2 | 3/2007 | Mattingly, Jr. |
| 7,196,124 B2 | 3/2007 | Parker et al. |
| 7,211,206 B2 | 5/2007 | Brown et al. |
| 7,267,288 B2 | 9/2007 | Wheeler, Jr. et al. |
| 7,316,559 B2 | 1/2008 | Taylor |
| 7,491,351 B2 | 2/2009 | Taylor et al. |
| 7,651,645 B2 | 1/2010 | Taylor |
| 7,794,817 B2 | 9/2010 | Brown |
| 2001/0009683 A1 | 7/2001 | Kitahama et al. |
| 2002/0034598 A1 | 3/2002 | Bonk et al. |
| 2002/0040071 A1 | 4/2002 | Lin et al. |
| 2002/0045048 A1 | 4/2002 | Bonk et al. |
| 2002/0048643 A1 | 4/2002 | Bonk et al. |
| 2002/0086913 A1 | 7/2002 | Roels et al. |
| 2002/0098362 A1 | 7/2002 | Mushovic |
| 2002/0171164 A1 | 11/2002 | Halterbaum et al. |
| 2002/0192456 A1 | 12/2002 | Mashburn et al. |
| 2003/0004232 A1 | 1/2003 | Ruede |
| 2003/0021915 A1 | 1/2003 | Rohatgi et al. |
| 2003/0065045 A1 | 4/2003 | Falke et al. |
| 2003/0083394 A1 | 5/2003 | Clatty |
| 2003/0090016 A1 | 5/2003 | Petrovic et al. |
| 2003/0143910 A1 | 7/2003 | Mashburn et al. |
| 2003/0158365 A1 | 8/2003 | Brauer et al. |
| 2003/0232933 A1 | 12/2003 | Lagneaux et al. |
| 2004/0048055 A1 | 3/2004 | Branca |
| 2004/0049002 A1 | 3/2004 | Andrews et al. |
| 2004/0121161 A1 | 6/2004 | Shugert et al. |
| 2004/0144287 A1 | 7/2004 | Tardif et al. |
| 2004/0198900 A1 | 10/2004 | Madaj |
| 2004/0266993 A1 | 12/2004 | Evans |
| 2005/0011159 A1 | 1/2005 | Standal et al. |
| 2005/0031578 A1 | 2/2005 | Deslauriers et al. |
| 2005/0079339 A1 | 4/2005 | Riddle |
| 2005/0131092 A1 | 6/2005 | Kurth et al. |
| 2005/0131093 A1 | 6/2005 | Kurth et al. |
| 2005/0161855 A1 | 7/2005 | Brown et al. |
| 2005/0163969 A1 | 7/2005 | Brown |
| 2005/0171243 A1 | 8/2005 | Hemmings et al. |
| 2005/0182228 A1 | 8/2005 | Kurth |
| 2005/0222303 A1 | 10/2005 | Cernohous |
| 2005/0260351 A1 | 11/2005 | Kurth et al. |
| 2005/0281999 A1 | 12/2005 | Hoffman et al. |
| 2005/0287238 A1 | 12/2005 | Taylor |
| 2006/0014891 A1 | 1/2006 | Yang et al. |
| 2006/0041155 A1 | 2/2006 | Casper |
| 2006/0041156 A1 | 2/2006 | Casper et al. |
| 2006/0045899 A1 | 3/2006 | Sarangapani |
| 2006/0071369 A1 | 4/2006 | Butteriss |
| 2006/0105145 A1 | 5/2006 | Brown |
| 2006/0115625 A1 | 6/2006 | Brown |
| 2006/0186571 A1 | 8/2006 | Brown |
| 2006/0186572 A1 | 8/2006 | Brown |
| 2006/0217517 A1 | 9/2006 | Daly |
| 2006/0270747 A1 | 11/2006 | Griggs |
| 2006/0273486 A1 | 12/2006 | Taylor et al. |
| 2007/0027227 A1 | 2/2007 | Shutov |
| 2007/0037953 A1 | 2/2007 | Geiger et al. |
| 2007/0052128 A1 | 3/2007 | Taylor |
| 2007/0066697 A1 | 3/2007 | Gilder et al. |
| 2007/0222105 A1 | 9/2007 | Brown |
| 2007/0222106 A1 | 9/2007 | Brown |
| 2007/0225391 A1 | 9/2007 | Brown |
| 2007/0225419 A1 | 9/2007 | Brown |
| 2008/0029925 A1 | 2/2008 | Brown |
| 2008/0132611 A1 | 6/2008 | Brown |
| 2009/0295021 A1 | 12/2009 | Brown |
| 2010/0025882 A1 | 2/2010 | Taylor et al. |
| 2010/0230852 A1 | 9/2010 | Brown |
| 2010/0264559 A1 | 10/2010 | Brown |
| 2010/0292397 A1 | 11/2010 | Brown |
| 2010/0296361 A1 | 11/2010 | Brown |

FOREIGN PATENT DOCUMENTS

| | | |
|---|---|---|
| CN | 1052991 | 5/2000 |
| CN | 1926282 | 3/2007 |
| DE | 2351844 | 4/1975 |
| GB | 1152306 | 5/1969 |
| GB | 1246940 | 9/1971 |
| GB | 2347933 | 9/2000 |
| JP | 51-89597 | 8/1976 |
| JP | 55-080456 | 6/1980 |
| JP | 58-132533 | 8/1983 |
| JP | 63-022819 | 1/1988 |
| JP | 63-202408 | 8/1988 |
| JP | 05-285941 | 11/1993 |
| JP | 07-076395 | 3/1995 |
| JP | 07-313941 | 12/1995 |
| JP | 08-188634 | 7/1996 |
| JP | 11-171960 | 6/1999 |
| JP | 2001-326361 | 11/2001 |
| JP | 2004-131654 | 4/2004 |
| JP | 2005-138567 | 6/2005 |
| KR | 2002-0086327 | 11/2002 |
| NZ | 226301 | 3/1990 |
| SG | 124156 | 12/2008 |
| WO | WO 81/03026 | 10/1981 |
| WO | WO 87/05541 | 9/1987 |
| WO | WO 91/00304 | 1/1991 |
| WO | WO 92/07892 | 5/1992 |
| WO | WO 93/19110 | 9/1993 |
| WO | WO 93/24549 | 12/1993 |
| WO | WO 94/25529 | 11/1994 |
| WO | WO 94/27697 | 12/1994 |
| WO | WO 97/11114 | 3/1997 |
| WO | WO 97/44373 | 11/1997 |
| WO | WO 98/08893 | 3/1998 |

(56) References Cited

FOREIGN PATENT DOCUMENTS

| | | |
|---|---|---|
| WO | WO 99/39891 | 8/1999 |
| WO | WO 00/17249 | 3/2000 |
| WO | WO 01/72863 | 10/2001 |
| WO | WO 02/01530 | 1/2002 |
| WO | WO 2004/078900 | 9/2004 |
| WO | WO 2004/113248 | 12/2004 |
| WO | WO 2005/053938 | 6/2005 |
| WO | WO 2005/056267 | 6/2005 |
| WO | WO 2005/072187 | 8/2005 |
| WO | WO 2005/072188 | 8/2005 |
| WO | WO 2005/094255 | 10/2005 |
| WO | WO 2005/123798 | 12/2005 |
| WO | WO 2006/012149 | 2/2006 |
| WO | WO 2006/137672 | 12/2006 |
| WO | WO2007/112104 | 10/2007 |
| WO | WO 2007/112105 | 10/2007 |

OTHER PUBLICATIONS

Bayer AG, Bayferrox Iron Oxide Pigments: Manufacturing, Properties and Application Recommendations.
Bayer Material Science, Product Index—Polyurethane Raw Materials Prepolymers and Systems (2006).
Bayer Material Science, Multranol 4035—Polyether Polyol, CAS No. 9049-71-2, Product Code: K114 (1997).
Bayer Material Science, Arcol LG-56—Polyether Polyol, CAS No. 25791-96-2, Product Code: KLLG56 (2003).
Bayer Material Science, Multranol 3900—Polyether Polyol (2006).
Bledzki et al., Impact Properties of Natural Fiber-Reinforced Epoxy Foams, J Cellular Plastics, vol. 35 (1999) pp. 550-562.
Certel, Editor: Polyurethane Handbook 2nd Edition: 1994: pp. 136-137, 182-183, 252-253; Carl Hanser Verlag, Munich.
Chawla, Excerpts from "Composite Materials: Science and Engineering," pp. 89-92, Spring Verlag, New York, NY (1987).
Cleated Belt Puller, http://www.esi-extrusion.com/cbpuller.htm, Aug. 5, 2002.
Custom Downstream Systems, Excerpts from Catalog, 6 pages including cover page.
Elias, Excerpts from "An Introduction to Polymer Science," pp. 408-409, VCH Publishers, Inc., New York, NY (1997).
Energy Efficient Building Products from Waste Materials, Development and Demonstration Project, Proposal, Sep. 10, 1999, NYS Energy Research & Development Authority.
Foamed Recyclables: New Process Efficiently Transforms Solid Waste into Synthetic Building Materials, Jan. 2002, United States Department of Energy, Office of Industrial Technologies, Inventions and Innovations Program.
Frisch et al., Hybrid IPN-Foam Composites, Cellular Polymers, Papers from a Three-day International Conference organized by Rapra Technology Limited, Mar. 20-22, 1991.
Guo et al., "Rigid Urethane Foams from a Soy Polyol-Dod Hybrid," USDA Agricultural Research Service, http://ars.usda.gov/research/publications/publications.htm?SEQ_NO_115=145249 (May 9, 2003).
Guo et al., "Polyols and Polyurethanes from Hydroformylation of Soybean Oil," J of Polymers & Environment 10(1-2):49-52 (2002).
Klempner et al., Excerpts from Handbook of Polymeric Foams and Foam Technology, 2d ed., pp. 121-124, 126, 128, 129, Hanser Publishers, Munich (2004).
Krishnamurthi et al.., Nano- and Micro-Fillers for Polyurethane Foams: Effect on Density and Mechanical Properties, Symposium (2001) pp. 239-244, Columbus, OH.
McMaster-Carr, Excerpts from Catalog, pp. 1052-1053.
National Center for Environmental Research and Quality Assurance, Office of Research and Development, U.S. Environmental Protection Agency, Abstract of "The Use of Multi-Component Waste Products for Use in Roofing Materials," May 9, 1998.
Nosker et al., Fiber Orientation and Creation of Structural Plastic Lumber, Plastics Engineering, (1999) pp. 53-56.
OSi Specialties, "Fomrez Tin Catalysts", 3 pages.
Petrovic et al., "Industrial Oil Products Program," AOCS Archives, (2007).
Pollack, "Soy vs. Petro Polyols a Life-Cycle Comparison," Omni Tech International, Ltd. (Feb. 2004).
"PVS Double Wall Corrugated Pipe Manufacturing Plant", Korea Association of Machinery Industry.
Randall et. al., Excerpts from "The Polyurethanes Book," pp. 1, 166-167, 210-213, 229-231, 263-264, Dunholm Publicity Ltd., United Kingdom (2002).
RDN Manufacturing Co., Inc., 140, 148 & 160 Belt Pullers, http://www.rdnmfg.com/products/pull140_160.htm, Aug. 5, 2002.
Shutov, Excerpts from Integral/Structural Polymer Foams: Technology, Properties and Applications (1986) pp. including preface, 3-4, 8-9, 13, 23-25, 131-134, 153-158, 167, 171, 176-179, 256.
Soyol Polyols and Systems Product Descriptions, www.soyol.com.
Tenibac-Graphion, Inc., Texturing Technologists, Brochure, Oct. 1, 1997.
Urethane Soy Systems Company, Material Safety Data Sheet, SoyTherm 50 A-side, pp. 1-8, Jul. 29, 2005.
Urethane Soy Systems Company, Material Safety Data Sheet, SoyTherm 50 B-side, pp. 1-8, Jul. 29, 2005.
Woods, Excerpts from "The ICI Polyurethanes Book," pp. 119-120, 127, 135-140, 158-159, The Netherlands (1987).
Wypych, Excerpts from "Fillers," pp. 4, 48, 57, ChemTech Publishing, Ontario Canada (1993).
Deposition of Thomas E. Jurgensen, pp. 1-407 (Jan. 9, 2006)—Redacted.
Deposition of Daniel Klempner, pp. 1-120 (Jan. 6, 2006)—Redacted.
Summary of Opinions, Daniel Klempner, pp. 1-11 (Jan. 4, 2006).
Deposition of John R Taylor, pp. 1-388 (Dec. 7, 2005)—Redacted.
Deposition of Fyodor Shutov vol. 1, pp. 1-312 (Dec. 15, 2005)—Redacted.
Deposition of Fyodor Shutov vol. 2, pp. 1-182 (Dec. 28, 2005)—Redacted.
Deposition of Wade Brown vol. 1, pp. 1-212 (Nov. 17, 2005)—Redacted.
Deposition of Wade Brown vol. 2, pp. 1-256 (Nov. 18, 2005)—Redacted.
Deposition of Wade Brown vol. 3, pp. 1-302 (Nov. 21, 2005)—Redacted.
Deposition of Edward J. Butteriss vol. 1, pp. 1-501 (Dec. 16, 2005).
Deposition of Edward J. Butteriss vol. 2, pp. 1-195 (Dec. 28, 2005).
Deposition of Zachary R. Taylor vol. 1, pp. 1-221 (Dec. 29, 2005)—Redacted.
Deposition of Zachary R. Taylor vol. 2, pp. 1-285 (Jan. 5, 2006)—Redacted.
Jan. 25, 2005 Int'l Search Report for Int'l App. No. PCT/US05/01570.
Nov. 15, 2005 Office Action issued in U.S. Appl. No. 10/764,012.
Dec. 5, 2005 Office Action issued in U.S. Appl. No. 10/764,013.
May 31, 2006 Office Action issued in U.S. Appl. No. 10/764,012.
Jun. 7, 2006 Office Action issued in U.S. Appl. No. 10/764,013.
Aug. 3, 2006 IPR on Patentability and Written Opinion in PCT/US2005/001569.
Aug. 3, 2006 IPR on Patentability and Written Opinion in PCT/US05/01570.
Aug. 7, 2006 Office Action issued in U.S. Appl. No. 11/165,071.
Aug. 29, 2006 Intl Search Report and Written Opinion in PCT/US05/22076.
Jan. 11, 2007 IPR on Patentability and Written Opinion in PCT/US05/22076.
Apr. 5, 2007 Notice of Allowance issued in U.S. Appl. No. 11/165,071.
Apr. 19, 2007 Supp IDS filed in U.S. Appl. No. 10/764,012.
Apr. 19, 2007 Supp IDS filed in U.S. Appl. No. 11/165,071.
Jul. 31, 2007 Office Action issued in U.S. Appl. No. 10/764,012.
Jul. 31, 2007 Written Opinion issued in Singapore Application No. 200604927-4.
Aug. 16, 2007 Notice of Allowance issued in U.S. Appl. No. 11/165,071.
Aug. 24, 2007 Office Action issued in U.S. Appl. No. 11/417,385.
Nov. 19, 2007 Int'l Search Report in Int'l App. No. PCT/US2007/007468.

(56) References Cited

OTHER PUBLICATIONS

Nov. 19, 2007 Int'l Search Report in Int'l App. No. PCT/US2007/007470.
Jan. 7, 2008 Office Action issued in U.S. Appl. No. 10/764,012.
Apr. 4, 2008 Office Action issued in CN App. No. 20058000030186.
May 26, 2008 Office Action issued in Indonesian App. No. W-00 2006 02034.
Jun. 3, 2008 Office Action issued in U.S. Appl. No. 11/593,316.
Jun. 20, 2008 Examination Report issued in Singapore Application No. 200604927-4.
Jun. 27, 2008 Office Action issued in U.S. Appl. No. 11/691,451.
Jun. 30, 2008 Office Action issued in U.S. Appl. No. 11/691,449.
Jul. 11, 2008 Final Office Action issued in U.S. Appl. No. 11/417,385.
Oct. 2, 2008 Office Action issued in U.S. Appl. No. 10/952,186.
Oct. 6, 2008 Office Action in U.S. Appl. No. 11/317,958.
Oct. 8, 2008 Notice of Allowance issued in U.S. Appl. No. 11/417,385.
Oct. 9, 2008 IPR and Written Opinion in PCT/US2007/007470.
Oct. 9, 2008 IPR on Patentability and Written Opinion in PCT/US2007/007468.
Oct. 31, 2008 Office Action issued in CN App. No. 20058000030186.
Nov. 7, 2008 Office Action in U.S. Appl. No. 11/407,416.
Nov. 7, 2008 Office Action in U.S. Appl. No. 11/407,661.
Jan. 13, 2009 Office Action in U.S. Appl. No. 10/761,012.
Jan. 22, 2009 European Supp. Search Report EP App. No. 05711595.8.
Jan. 26, 2009 NZ Office Action issued in NZ App. No. 548628.
Feb. 5, 2009 Final Office Action issued in U.S. Appl. No. 11/593,316.
Feb. 23, 2009 NZ Office Action issued in NZ App. No. 548626.
Feb. 24, 2009 European Search Report for EP App. No. 05762651.7.
Mar. 26, 2009 Non-Final Rejection of U.S. Appl. No. 11/317,494.
Apr. 16, 2009 Final Office Action issued in U.S. Appl. No. 10/952,186.
Apr. 17, 2009 Final Office Action issued in U.S. Appl. No. 11/691,449.
Apr. 24, 2009 Office Action issued in CN App. No. 20058000030186.
May 6, 2009 Office Action issued in AU App. No. 2005208713.
May 11, 2009 European Office Action issued in EP App. No. 05711595.8.
May 12, 2009 Final Office Action issued in U.S. Appl. No. 11/691,451.
May 28, 2009 Final Office Action issued in U.S. Appl. No. 11/317,958.
Jun. 10, 2009 Office Action issued in U.S. Appl. No. 11/691,438.
Jun. 26, 2009 Office Action issued in AU App. No. 2005208714.
Jul. 9, 2009 Office Action issued in U.S. Appl. No. 11/841,901.
Jul. 23, 2009 Office Action issued in U.S. Appl. No. 11/691,446.
Aug. 7, 2009 Office Action issued in CN App. No. 2005800206677.
Aug. 20, 2009 Office Action issued in U.S. Appl. No. 11/407,416.
Aug. 20, 2009 Office Action issued in U.S. Appl. No. 11/407,661.
Aug. 20, 2009 Office Action issued in U.S. Appl. No. 10/764,012.
Sep. 10, 2009 Notice of Allowance issued in U.S. Appl. No. 11/593,316.
Sep. 11, 2009 Notification of Decision of Rejection issued in CN App. No. 20058000030186.
Sep. 21, 2009 Office Action issued in U.S. Appl. No. 11/317,494.
Sep. 23, 2009 Office Action issued in U.S. Appl. No. 11/691,456.
Oct. 2, 2009 European Office Action for EP App. No. 05762651.7.
Oct. 6, 2009 Office Action issued in AU App. No. 2005267399.
Dec. 10, 2009 Office Action issued in U.S. Appl. No. 10/952,186.
Dec. 21, 2009 Office Action issued in U.S. Appl. No. 11/317,958.
Dec. 30, 2009 Office Action issued in U.S. Appl. No. 11/691,451.
Dec. 30, 2009 Office Action Issued in U.S. Appl. No. 11/691,449.
Feb. 24, 2010 Final Office Action issued in U.S. Appl. No. 11/691,446.
Mar. 17, 2010 Final Office Action issued in U.S. Appl. No. 11/841,901.
Apr. 21, 2010 Notice of Allowance issued in U.S. Appl. No. 10/764,012.
May 5, 2010 Notice of Allowance issued in U.S. Appl. No. 10/952,186.
May 6, 2010 Notice of Allowance issued in U.S. Appl. No. 11/317,494.
May 25, 2010 Final Office Action issued in U.S. Appl. No. 11/407,416.
May 27, 2010 Final Office Action issued in U.S. Appl. No. 11/407,661.
Jun. 11, 2010 Final Office Action issued in U.S. Appl. No. 11/691,438.
Jun. 30, 2010 Office Action issued in U.S. Appl. No. 12/361,488.
Jul. 23, 2010 Final Office Action issued in U.S. Appl. No. 11/691,449.
Aug. 6, 2010 Notice of Allowance issued in U.S. Appl. No. 11/317,494.
Oct. 21, 2010 Office Action Issued in U.S. Appl. No. 12/727,365.
Nov. 23, 2010 Final Office Action issued in U.S. Appl. No. 12/361,488.
Nov. 26, 2010 Office Action issued in U.S. Appl. No. 12/843,265.
Nov. 29, 2010 JP Office Action issued in JP App. No. 2006-551203.
Dec. 3, 2010 Office Action issued in U.S. Appl. No. 12/786,206.
Dec. 8, 2010 Office Action issued in U.S. Appl. No. 12/473,138.
Dec. 29, 2010 Office Action issued in U.S. Appl. No. 12/710,472.
Feb. 18, 2011 Office Action issued in U.S. Appl. No. 11/691,438.
Feb. 24, 2011 Office Action issued in U.S. Appl. No. 11/691,451.
Feb. 24, 2011 Office Action issued in U.S. Appl. No. 11/691,449.
Mar. 3, 2011 Chinese Office Action issued in CN App. No. 2005800206677.
Mar. 29, 2011 Notice of Allowance issued in U.S. Appl. No. 11/407,661.
Apr. 4, 2011 Notice of Allowance from U.S. Appl. No. 11/407,416.
Jul. 12, 2011 Final OA in related U.S. Appl. No. 12/727,365.
Jul. 18, 2011 Final OA in related U.S. Appl. No. 12/843,265.
Jul. 21, 2011 EESR and Search Opinion for EP App. No. 11165942.1.
Aug. 5, 2011 Office Action in related U.S. Appl. No. 12/692,241.
Past, present, and future office actions, amendments, arguments, and other relevant documents or materials in the file history of co-pending U.S. Appl. No. 10/764,012, filed Jan. 23, 2004, Filled Polymer Composite and Synthetic Building Material Compositions.
Past, present, and future office actions, amendments, arguments, and other relevant documents or materials in the file history of co-pending U.S. Appl. No. 10/764,013, filed Jan. 23, 2004, Continuous Forming System Utilizing Up to Six Endless Belts.
Past, present, and future office actions, amendments, arguments, and other relevant documents or materials in the file history of co-pending U.S. Appl. No. 10/952,186, filed Sep. 28, 2004, Apparatus for the Continuous Production of Plastic Composites.
Past, present, and future office actions, amendments, arguments, and other relevant documents or materials in the file history of co-pending U.S. Appl. No. 11/165,071, filed Jun. 23, 2005, Continuous Forming Apparatus for Three-Dimensional Foam Products.
Past, present, and future office actions, amendments, arguments, and other relevant documents or materials in the file history of co-pending U.S. Appl. No. 11/317,494, filed Dec. 22, 2005, Filled Polymer Composite and Synthetic Building Material Compositions.
Past, present, and future office actions, amendments, arguments, and other relevant documents or materials in the file history of co-pending U.S. Appl. No. 11/317,958, filed Dec. 22, 2005, Filled Polymer Composite and Synthetic Building Material Compositions.
Past, present, and future office actions, amendments, arguments, and other relevant documents or materials in the file history of co-pending U.S. Appl. No. 11/407,661, filed Apr. 20, 2006, Filled Polymer Composite and Synthetic Building Material Compositions.
Past, present, and future office actions, amendments, arguments, and other relevant documents or materials in the file history of co-pending U.S. Appl. No. 11/407,416, filed Apr. 20, 2006, Filled Polymer Composite and Synthetic Building Material Compositions.
Past, present, and future office actions, amendments, arguments, and other relevant documents or materials in the file history of co-pending U.S. Appl. No. 11/417,385, filed May 4, 2006, Continuous Forming System Utilizing Up to Six Endless Belts.
Past, present, and future office actions, amendments, arguments, and other relevant documents or materials in the file history of co-pending U.S. Appl. No. 11/593,316, filed Nov. 6, 2006, Method for Molding Three-Dimensional Foam Products Using a Continuous Forming Apparatus.
Past, present, and future office actions, amendments, arguments, and other relevant documents or materials in the file history of co-pending U.S. Appl. No. 11/691,446, filed Mar. 26, 2007, Extrusion of Polyurethane Composite Materials.

(56) References Cited

OTHER PUBLICATIONS

Past, present, and future office actions, amendments, arguments, and other relevant documents or materials in the file history of co-pending U.S. Appl. No. 11/691,451, filed Mar. 26, 2007, Polyurethane Composite Materials.

Past, present, and future office actions, amendments, arguments, and other relevant documents or materials in the file history of co-pending U.S. Appl. No. 11/691,438, filed Mar. 26, 2007, Polyurethane Composite Materials.

Past, present, and future office actions, amendments, arguments, and other relevant documents or materials in the file history of co-pending U.S. Appl. No. 11/691,449, filed Mar. 26, 2007, Polyurethane Composite Materials.

Past, present, and future office actions, amendments, arguments, and other relevant documents or materials in the file history of co-pending U.S. Appl. No. 11/691,456, filed Mar. 26, 2007, entitled Extrusion of Polyurethane Composite Materials.

Past, present, and future office actions, amendments, arguments, and other relevant documents or materials in the file history of co-pending U.S. Appl. No. 11/841,901, filed Aug. 20, 2007, entitled Filled Polymer Composite and Synthetic Building Material Compositions.

Past, present, and future office actions, amendments, arguments, and other relevant documents or materials in the file history of co-pending U.S. Appl. No. 12/361,488, filed Jan. 28, 2009, entitled Continuous Forming System Utilizing Up to Six Endless Belts.

Past and present office actions, amendments, arguments, and other relevant documents or materials in the file history of co-pending U.S. Appl. No. 12/473,138, filed May 27, 2009, entitled Extrusion of Polyurethane Composite Materials.

Past, present, and future office actions, amendments, arguments, and other relevant documents or materials in the file history of U.S. Appl. No. 12/692,241, filed Jan. 22, 2010, Method for Molding Three-Dimensional Foam Products Using a Continuous Forming Apparatus.

Past, present, and future office actions, amendments, arguments, and other relevant documents or materials in the file history of co-pending U.S. Appl. No. 12/710,472, filed Feb. 23, 2010, Extrusion of Polyurethane Composite Materials.

Past, present, and future office actions, amendments, arguments, and other relevant documents or materials in the file history of co-pending U.S. Appl. No. 12/727,365, filed Mar. 19, 2010, Filled Polymer Composite and Synthetic Building Material Compositions.

Past, present, and future office actions, amendments, arguments, and other relevant documents or materials in the file history of co-pending U.S. Appl. No. 12/786,206, filed May 24, 2010, Extrusion of Polyurethane Composite Materials.

Past, present, and future office actions, amendments, arguments, and other relevant documents or materials in the file history of co-pending U.S. Appl. No. 12/843,265, filed Jul. 26, 2010, Filled Polymer Composite and Synthetic Building Material Compositions.

Past, present, and future office actions, amendments, arguments, and other relevant documents or materials in the file history of co-pending U.S. Appl. No. 13/010,646, filed Jan. 20, 2011, Extrusion of Polyurethane Composite Materials.

Past, present, and future office actions, amendments, arguments, and other relevant documents or materials in the file history of co-pending U.S. Appl. No. 13/112,670, filed May 20, 2011, Continuous Forming System Utilizing Up to Six Endless Belts.

Past, present, and future office actions, amendments, arguments, and other relevant documents or materials in the file history of co-pending U.S. Appl. No. 13/152,190, filed Jun. 2, 2011, Extrusion of Polyurethane Composite Materials.

Past, present, and future office actions, amendments, arguments, and other relevant documents or materials in the file history of co-pending U.S. Appl. No. 13/155,066, filed Jun. 7, 2011, Extrusion of Polyurethane Composite Materials.

Past, present, and future office actions, amendments, arguments, and other relevant documents or materials in the file history of co-pending U.S. Appl. No. 13/170,932, filed Jun. 28, 2011, Extrusion of Polyurethane Composite Materials.

\* cited by examiner

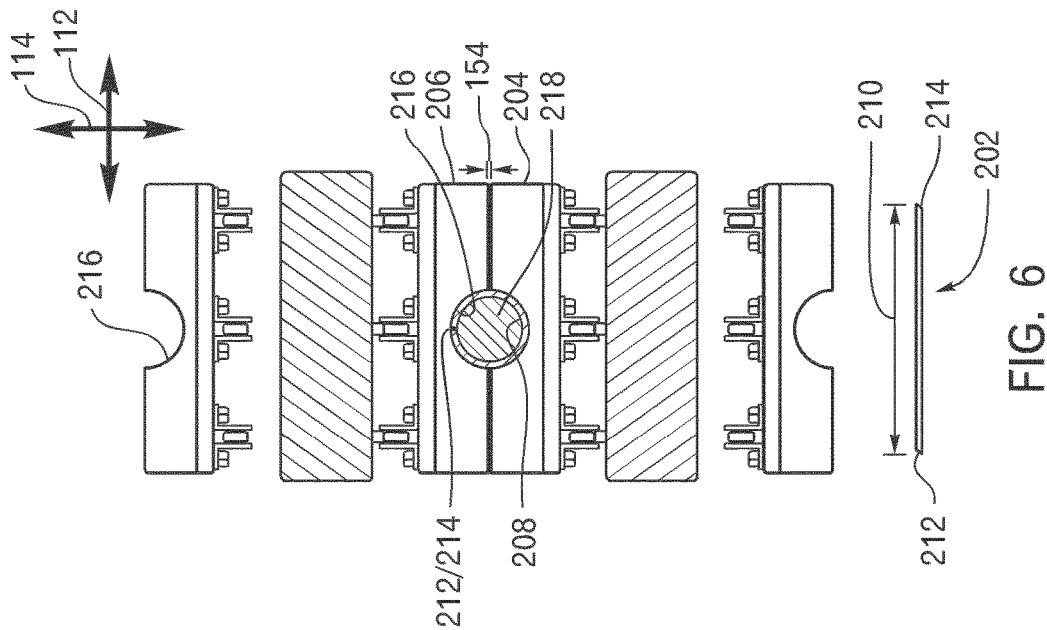
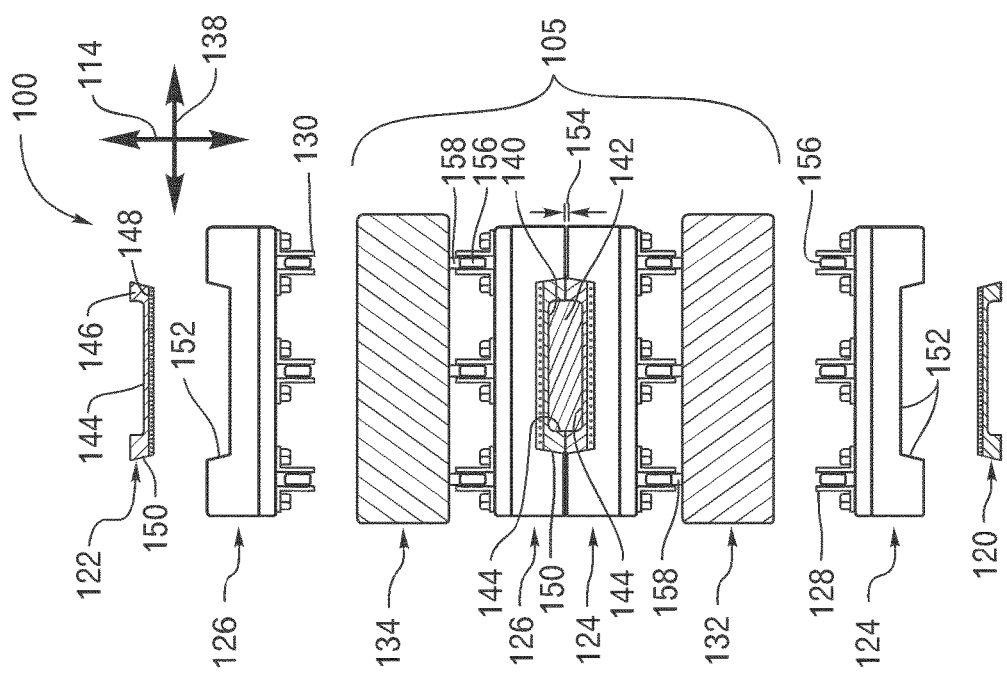
FIG. 6
FIG. 2

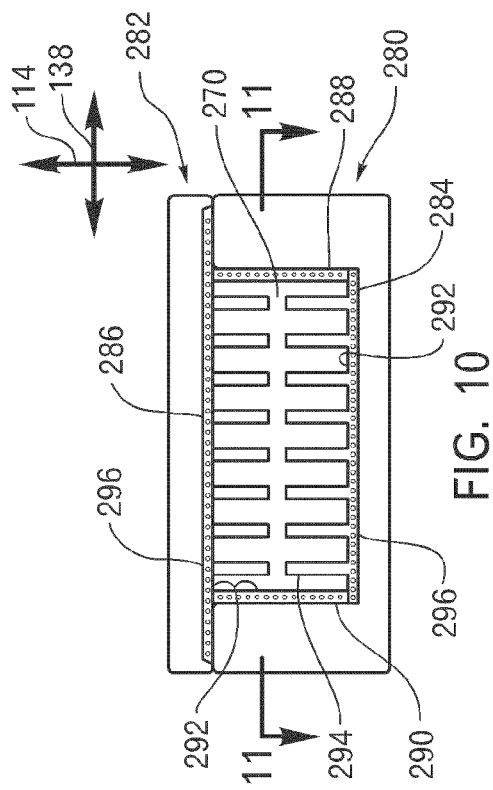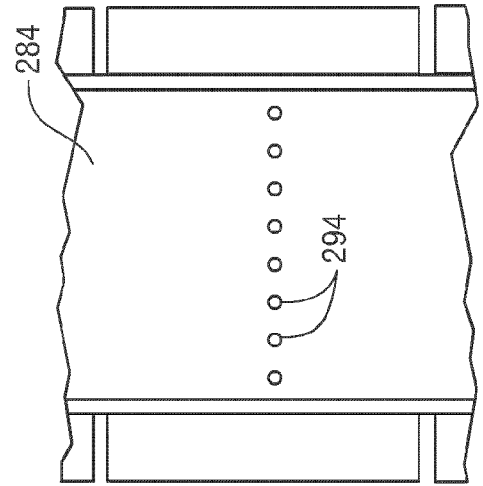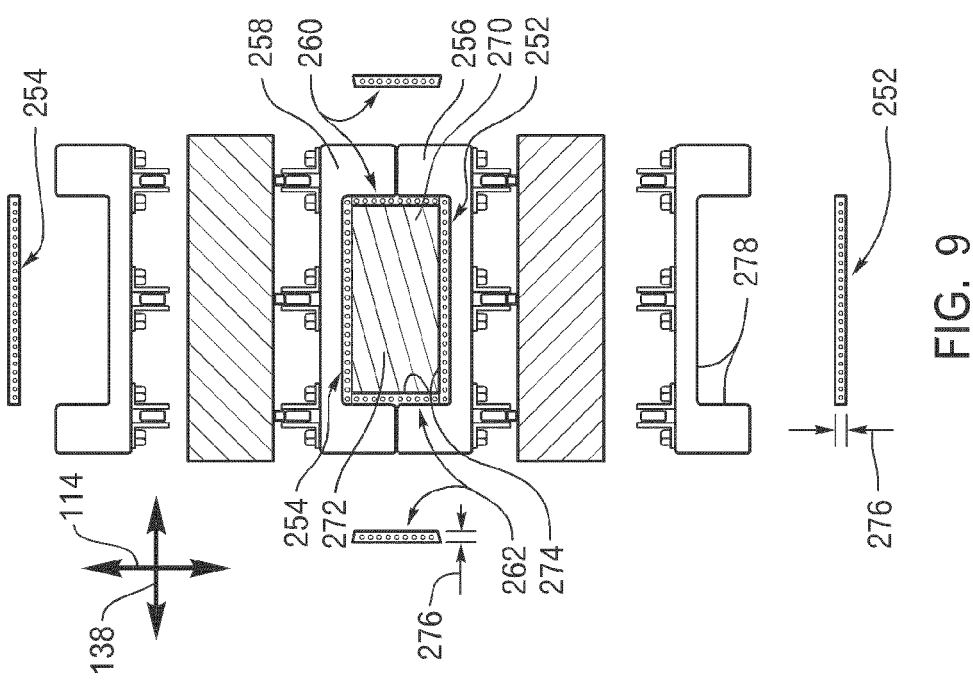

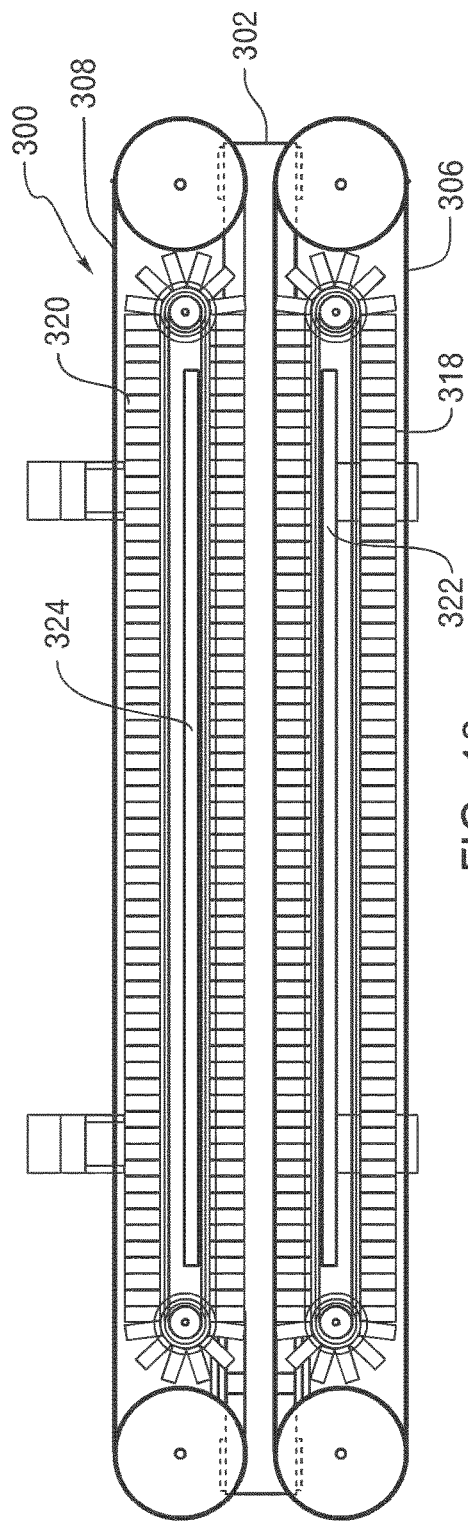
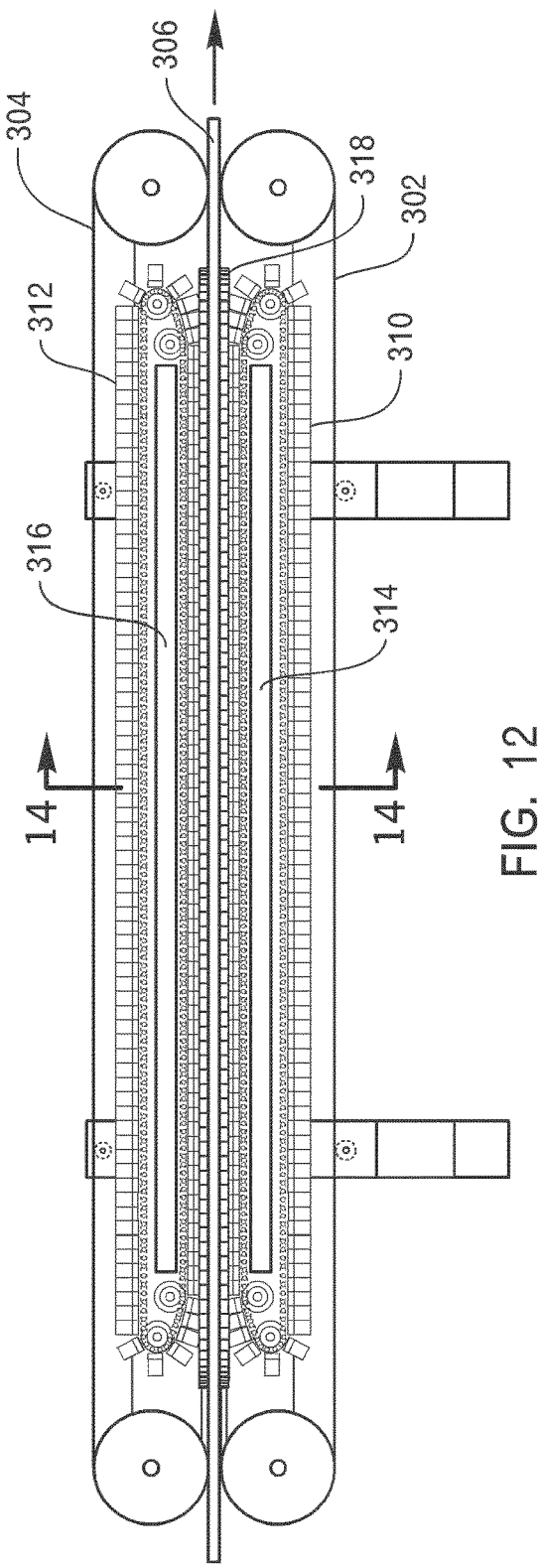
FIG. 13
FIG. 12

METHOD FOR MOLDING THREE-DIMENSIONAL FOAM PRODUCTS USING A CONTINUOUS FORMING APPARATUS

CROSS-REFERENCE TO RELATED APPLICATIONS

The present application is a continuation of U.S. patent application Ser. No. 15/213,275, filed Jul. 18, 2016 which is a continuation of U.S. patent application Ser. No. 14/967,052, filed Dec. 11, 2015 which is a continuation of U.S. patent application Ser. No. 14/180,630, filed Feb. 14, 2014 which is a continuation of U.S. patent application Ser. No. 13/681,222, filed Nov. 19, 2012 which is a continuation of U.S. patent application Ser. No. 13/366,136, filed Feb. 3, 2012 which is a continuation of U.S. patent application Ser. No. 12/692,241, filed Jan. 22, 2010 which is a continuation of U.S. patent application Ser. No. 11/593,316, filed Nov. 6, 2006, now U.S. Pat. No. 7,651,645, issued Jan. 26, 2010 which is a continuation of U.S. patent application Ser. No. 11/165,071, filed Jun. 23, 2005, now U.S. Pat. No. 7,316,559, issued Jan. 8, 2008 which claims priority benefit under 35 U.S.C. § 119(e) from U.S. Provisional Application No. 60/582,420, filed Jun. 24, 2004. The present application incorporates all of these documents herein by reference.

BACKGROUND OF THE INVENTION

The present invention relates generally to continuous forming apparatus and methods for forming foam materials into three-dimensional shapes. Generally, the production of three-dimensional products made from a foam material requires a mold that can both define the three-dimensional shape and contain any pressure exerted by the foam material until the product is rigid enough to be removed from the mold.

To accomplish these requirements, currently available production apparatus for continuous production include endless flexible mold belts and chain-mounted rigid mold sections. Endless flexible mold belts that are used to form 3-D products on a continuous basis may be done by arranging one or more flat belts edge to edge so as to form a cavity, or by using two thicker belts, arranged face to face, with a cross sectional shape extending into one or both of the belt faces. As used herein, the term "flat" means relatively flat so that a flat surface may be rough and include any type of surface finish.

The belts may be incorporated into a motorized forming apparatus similar to a conveyor belt machine. The belts are typically fabric-reinforced, and may be faced with an elastomeric, contoured face so as to allow the molding of deeper features and to provide the mold belt with sufficient flexibility to bend around the pulleys of the motorized forming apparatus. An extruder or other delivery system may be used to deliver material into one end of a forming apparatus where it is held and conveyed within a mold belt cavity until the material is sufficiently cured or cooled to maintain its shape after being expelled from the apparatus. These currently available belt-driven continuous forming apparatus are typically used to produce small cross sectional area products.

The production of parts with larger cross sections or deeper surface detail typically requires the use of a machine that utilizes chain-mounted rigid mold sections. For example, foam parts with surface detail like imitation wood beams are sometimes produced on a continuous basis using these continuous forming apparatus. However, these machines are extremely expensive and adjacent mold sections must fit together precisely to prevent material from oozing and binding between mold sections.

Large foam buns are continuously cast in square forming machines that are comprised of table-top conveyors using thin flat plates attached to chains. Multiple belts of flat plates are combined to make a continuous square cavity to support and mold the foam product. A wax paper or plastic film is used to prevent the foaming material from sticking to and leaking between the plates. The buns are then slit to make mattresses and the like.

While mold belts may define the desired three-dimensional product shape, they must be driven in the direction of production, and supported so as to contain the pressure of the foaming material without deforming. Typically, these belts are driven by a motorized pulley and supported by either slider-beds or by support rollers in much the same way as a conventional conveyor belt. Slider-bed supported systems must overcome the pressure-induced friction between the back of the belt and the slider-bed. The wider the product and longer the forming apparatus, the greater the friction that the drive mechanism must overcome, which limits the practical size of a slider-bed supported forming apparatus for foam materials.

Roller-supported mold belts minimize belt-to-bed friction, but the belts are unsupported in the spans' between adjacent rollers, allowing the belt to deflect outward. The roller-bed supported belts virtually eliminate the friction associated with slider-beds, but the foaming pressure on the belt is not supported between individual rollers allowing the belts to intermittently gap open as they travel.

The friction problem of the slider-bed may be mitigated by using air film lubrication. However, the foaming pressure is not constant along the length of the machine, especially for thermoset foams. Thus, air film lubrication requires the regulation of air pressure to discrete pressure zones along the machine's length. Additionally, air film lubrication is limited to smaller parts with low foaming pressures in order to avoid using excessively high-pressure air.

Accordingly, a need exists for continuous forming apparatus that fully support high foaming pressures while the foam material cools and cures. Furthermore, a need exists for continuous forming apparatus that experiences minimal frictional forces so that the continuous forming apparatus is able to mold wider foam products without sacrificing the dimensional accuracy, surface detail, and desired cross section of the foam product.

SUMMARY OF THE INVENTION

The apparatus of the present invention has been developed in response to the present state of the art, and in particular, in response to the problems and needs in the art that have not been fully solved by currently available continuous forming apparatus. Thus, the present invention provides a continuous forming apparatus for molding foaming material into foam products.

In accordance with the invention as embodied and broadly described herein in the preferred embodiment, a continuous forming apparatus is provided. According to one embodiment, the continuous forming apparatus includes a first endless belt for molding the foam material, a first plurality of cleats, and a second plurality of cleats opposed to the first plurality of cleats.

The first endless belt may impart surface features or texture to the product surface, and may also incorporate non-stick films or compounds as mold release agents. The first endless belt may be rolled or folded so as to define a mold cavity. The mold belt cavity may impart any 3-dimensional shape, profile, texture, or features into the foam product.

The first plurality of cleats may have a three-dimensional abutment surface to provide transverse and lateral support to the first endless belt. The first plurality of cleats may also be shaped to provide transverse and lateral support to the foam material as it cures and is molded. The second plurality of cleats may have a flat abutment surface or a three-dimensional abutment surface depending on the size and complexity of the foam part to be molded.

The continuous forming apparatus may also include a drive mechanism for imparting motion to the first endless belt, the first plurality of cleats, and the second plurality of cleats. The drive mechanism may be connected to the first endless belt, the first plurality of cleats, and the second plurality of cleats so that they move at the same speed. By moving at the same speed, the first plurality of cleats and the second plurality of cleats may grip the first endless belt to provide constant support to the first endless belt as a molded foam product is cured and to reduce the friction resulting from moving the first endless belt.

The continuous forming apparatus may comprise a first attachment chain connecting the first plurality of cleats together and a second attachment chain connecting the second plurality of cleats together. The attachment chains permit the plurality of cleats to form an endless loop that provides constant support to the first endless belt as a molded foam product is cured. Furthermore, the attachment chains are used to space each cleat of each plurality of cleats. The attachment chains keep each cleat close to the adjacent cleats to support the endless belts without overlapping or binding with the adjacent cleats. By keeping each cleat close to the adjacent cleats, the unsupported sections of the endless belts are kept to a minimum.

The continuous forming apparatus may also include a second endless belt that cooperates with the first endless belt to mold the foam material. The second endless belt may be supported by the second plurality of cleats. In some configurations, the second plurality of cleats may include a three-dimensional abutment surface that grips the second endless belt and provides transverse and lateral support to the second endless belt. Together, the first endless belt and the second endless belt may define a mold cavity for forming a molded foam product. The plurality of cleats supports the first endless belt and the second endless belt against the high pressures that may be experienced as the foam material is molded within the continuous forming apparatus.

The continuous forming apparatus may also include a third endless belt and a fourth endless belt that cooperate with the first endless belt and the second endless belt to mold the foam material. The continuous forming apparatus may further comprise a third plurality of cleats and a fourth plurality of cleats disposed generally orthogonal to the first plurality of cleats and the second plurality of cleats. The third endless belt may be supported by the third plurality of cleats and the fourth endless belt may be supported by the fourth plurality of cleats.

In configurations where the third endless belt and the fourth endless belt are disposed orthogonally to the first endless belt and the second endless belt, the continuous forming apparatus may be used to efficiently produce a range of simulated lumber products in sizes such as 2×2, 2×4, 2×6, 2×8, 2×10, and 2×12, by adjusting the distance between the third endless belt and the fourth endless belt.

The continuous forming apparatus may have a third attachment chain connecting the third plurality of cleats together and a fourth attachment chain connecting the fourth plurality of cleats together. The third and fourth pluralities of cleats help to control the distance between the third endless belt and the fourth endless belt over the length of the continuous forming apparatus.

The first endless belt may include an insert support feature for positioning inserts within the mold cavity prior to adding foam material to the mold cavity. Furthermore, the first endless belt may comprise a mold cavity for molding a discrete foam part. By forming a mold cavity shaped to mold a discrete foam part, discrete foam parts may be made inexpensively on a continuous basis. Specifically, the first endless belt comprising a plurality of discrete mold cavities may produce discrete foam parts less expensively than using several discrete molds.

The first endless belt may also be supported by the first plurality of cleats to form a curved cross sectional area for molding foam material. In some configurations, the first endless belt may also be supported by the second plurality of cleats to form a circular cross sectional area for molding foam material into a cylindrical product.

The continuous forming apparatus may also comprise a first frame disposed to support the first plurality of cleats and a second frame disposed to support the second plurality of cleats. The frames provide support for the cleats to support the first and second endless belts and permit the continuous forming apparatus to be used with foam materials that exert relatively high pressures against the mold such as thermoset plastics that are cured in an exothermic reaction and coupled with a foaming agent.

The frames also permit a transverse gap to be disposed between the first plurality of cleats and the second plurality of cleats when the first plurality of cleats supports the first endless belt for molding foam material. The gap is closed by one or more of the endless belts to prevent the foaming material from exiting the mold cavity. Additionally, leaving a small gap between the first plurality of cleats and the second plurality of cleats may help to prevent the first plurality of cleats from binding with the second plurality of cleats. The gap may range from about an inch to almost abutting but preferably is about 0.1 inches. Of course, the first plurality of cleats may abut the second plurality of cleats when the first plurality of cleats supports the first endless belt for molding foam material.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 is a cross sectional view of the continuous forming apparatus of FIG. 1 along line 2-2;

FIG. 6 is a cross sectional view of the continuous forming apparatus of FIG. 5 along line 6-6;

FIG. 9 is a cross sectional view of the continuous forming apparatus of FIG. 7 along line 9-9;

FIG. 10 is an alternative cross sectional view of a cleat of a first plurality of cleats, a cleat of a second plurality of cleats, a first endless belt, a second endless belt, a third endless belt, and a fourth endless belt that may be used with the continuous forming apparatus of FIG. 7 taken along line 9-9;

FIG. 11 is a cross sectional view of the first endless mold belt surface, a cleat of a first plurality of cleats, a second endless belt, and a third endless belt of FIG. 10 along line 11-11;

FIG. 12 is an elevated side view of an alternative continuous forming apparatus according to the invention;

FIG. 13 is a top view of the continuous forming apparatus of FIG. 12;

DETAILED DESCRIPTION OF THE PREFERRED EMBODIMENT

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the continuous forming apparatus of the present invention, as represented in FIGS. 1 through 18, is not intended to limit the scope of the invention, as claimed, but is merely representative of presently preferred embodiments of the invention.

Figure 1:
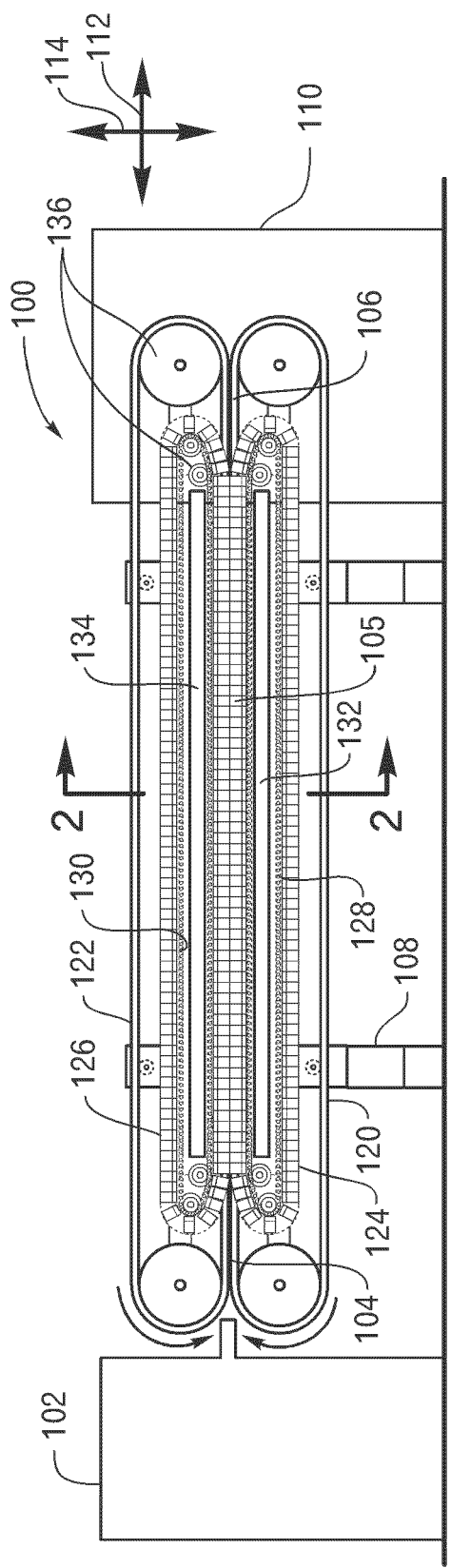
FIG. 1 is an elevated side view of a continuous forming apparatus within the scope of the invention.

FIG. 1 is an elevated side view of a continuous forming apparatus 100 according to the invention. The continuous forming apparatus 100 receives foaming material from a feeder machine 102 in an input end 104, such as an extrusion machine or other feeding machine known in the art, for delivering foaming materials to the continuous forming apparatus 100 by pouring, dropping, extruding, spreading, or spraying foaming material onto or into the continuous forming apparatus 100. Once the foaming material cures and moves through the molding section 105, it exits the continuous forming apparatus 100 as a foam product from the output end 106 of the continuous forming apparatus 100.

Foaming materials may include but are not limited to thermoplastic and thermoset plastic compounds, highly-filled plastic compounds, composite materials, elastomers, ceramic materials, and cementitious materials that may be mixed with a foaming agent known in the art.

The continuous forming apparatus 100 may include a support structure 108 that supports and positions the components of the continuous forming apparatus 100 and a drive mechanism 110 for imparting motion to various components of the continuous forming apparatus 100. The drive mechanism 110 may generally include a motor and gears for providing the various components of the continuous forming apparatus 100 with the correct force and speed needed for the efficient operation of the continuous forming apparatus 100.

As shown, the continuous forming apparatus 100 has a longitudinal direction 112 and a transverse direction 114.

The continuous forming apparatus 100 may also include a first endless belt 120 and a second endless belt 122 that is opposed to the first endless belt 120. Together, the first endless belt 120 and the second endless belt 122 define a mold cavity for defining the outside dimensions of a foam product. In other words, the first endless belt 120 and the second endless belt 122 contain and provide the foaming material with a final shape as it moves from the input end 104 to the output end 106 of the continuous forming apparatus 100. Of course, the first endless belt 120 and the second endless belt 122 may be covered with mold release to prevent the foaming material from sticking to the endless belts 120, 122.

The continuous forming apparatus 100 may also include a first plurality of cleats 124 and a second plurality of cleats 126 opposed to the first plurality of cleats 124. The first plurality of cleats 124 and the second plurality of cleats 126 engage and support the first endless belt 120 and the second endless belt 122 respectively in molding the foaming material into a foam product. The first plurality of cleats 124 and the second plurality of cleats 126 also prevent the first endless belt 120 and the second endless belt 122 from deforming from the pressure exerted by the foaming material within the mold cavity.

The first plurality of cleats 124, the second plurality of cleats 126, the first endless belt 120, and the second endless belt 122 may be driven or pulled by the drive mechanism 110 at the same speed or at different speeds to move foaming material from the input end 104 to the output end 106 of the continuous forming apparatus 100. Alternatively, the first endless belt 120 and the second endless belt 122 may be un-powered or idle and driven by the first plurality of cleats 124 and the second plurality of cleats 126. Of course, moving the first plurality of cleats 124, the second plurality of cleats 126, the first endless belt 120, and the second endless belt 122 at the same speed helps to prevent damage to the first endless belt 120 and the second endless belt 122 or the foam product held by the first endless belt 120 and the second endless belt 122. By having the pluralities of cleats 124, 126, move with the endless belts 120, 122, friction is reduced in the continuous forming apparatus 100 so that the continuous forming apparatus 100 may use longer and wider endless belts than previously possible.

The first plurality of cleats 124 may be attached together by a first attachment chain 128 to form an endless loop so that the first plurality of cleats 124 may be positioned to continuously provide support to the first endless belt 120 as it molds foaming material. Similarly, the second plurality of cleats 126 may be attached together by a second attachment chain 130 to form an endless loop so that the second plurality of cleats 126 may be positioned to continuously provide support to the second endless belt 122 as it molds foaming material.

The first attachment chain 128 and the second attachment chain 130 hold each cleat of the first plurality of cleats 124 and the second plurality of cleats 126, respectively, spaced at a desired distance to provide support to the first endless belt 120 and the second endless belt 122 without binding up against each other. When the first plurality of cleats 124 and the second plurality of cleats 126 engage the first endless belt 120 and the second endless belt 122, the first attachment chain 128 and the second attachment chain 130 space the cleats of the first plurality of cleats 124 and the second plurality of cleats 126 so that the longitudinal gap between each cleat is kept to a minimum to provide a relatively continuous support surface. Generally, the longitudinal gap may be about 0.1 inches, though the longitudinal gap may be smaller or larger than this depending on the foaming pressures of the foaming material and the strength of the first endless belt 120 and the second endless belt 122 to span the longitudinal gap without deformation or opening of the mold cavity.

The continuous forming apparatus 100 may include a first frame 132 and a second frame 134 that may be attached to the support structure 108. The first frame 132 and the second frame 134 may include rigid slide rails or similar features that engage the first plurality of cleats 124 and the second plurality of cleats 126. The first frame 132 and the second frame 134 help to position the first plurality of cleats 124 and the second plurality of cleats 126 to support and engage the first endless belt 120 and the second endless belt 122. Additionally, the first frame 132 and the second frame 134 help to close the first plurality of cleats 124 with the second plurality of cleats 126 about the first endless belt 120 and the second endless belt 122.

More specifically, compressive loads from the foaming material may press the first endless belt 120 and the second endless belt 122 into the first plurality of cleats 124 and the second plurality of cleats 126, respectively. The normal loads that would tend to separate the opposing first plurality of cleats 124 and the second plurality of cleats 126 are reacted through the first attachment chain 128 and the second attachment chain 130 to the first frame 132 and the second frame 134. To minimize friction, the first attachment chain 128 and the second attachment chain 130 may include rolling elements that contact the first frame 132 and the second frame 134.

The first attachment chain 128 and the second attachment chain 130 also provide a structure strong enough to permit the drive mechanism 110 to move the first plurality of cleats 124, the second plurality of cleats 126, the first endless belt 120, and the second endless belt 122 from the input end 104 to the output end 106 of the continuous forming machine 100. In some configurations, positive drive engagement is provided by the use of sprockets in the drive mechanism 110 that engage and move the chain links.

A speed-controlled motor may be mechanically linked to a sprocket in the drive mechanism 110 to drive the continuous forming apparatus 100. Furthermore, a single motor may be mechanically linked to one or more of the first plurality of cleats 124, the second plurality of cleats 126, the first endless belt 120, and the second endless belt 122. Alternatively, the drive mechanism 110 may include separate motors that are electronically linked that permit the motors to operate at a similar speed to drive two or more of the first plurality of cleats 124, the second plurality of cleats 126, the first endless belt 120, and the second endless belt 122.

The continuous forming apparatus 100 may further include pulleys or sprockets 136 for positioning the first plurality of cleats 124, the second plurality of cleats 126, the first endless belt 120, and the second endless belt 122 relative to each other and the first frame 132 and the second frame 134. Additionally, once a cleat of the plurality of cleats 124, 126 or a portion of one of the endless belts 120, 122 reach the output end 106 of the continuous forming apparatus 100, the cleat or portion rounds a respective pulley or sprocket 136 and returns outside of the molding section 105 to the input end 104 of the continuous forming apparatus 100. At the input end 104 of the continuous forming apparatus 100 new forming material is picked up by the first endless belt 120 and the second endless belt 122, the first plurality of cleats 124 and the second plurality of cleats 126 engage and support the first endless belt 120 and the second endless belt 122, and the foaming material is transported through the molding section 105.

FIG. 2 is a cross sectional view of the continuous forming apparatus 100 of FIG. 1 along line 2-2. In conjunction with FIG. 1, the continuous forming apparatus 100 has a transverse direction 114 and a lateral direction 138.

As shown, the first endless belt 120 and the second endless belt 122 cooperate to form a mold cavity 140, in which foaming material 142 is being molded to have a generally rectangular profile. The first endless belt 120 and the second endless belt 122 may be mirrors of each other so that the first endless belt 120 and the second endless belt 122 each define half of the mold cavity 140.

The first endless belt 120 and the second endless belt 122 may each have a three dimensional molding surface 144 that may be made of an elastomeric material 146 and may comprise fiber reinforcement 148. The elastomeric material 146 is flexible to permit the first endless belt 120 and the second endless belt 122 to bend around the pulleys 136 of FIG. 1. The elastomeric material 146 may include a filler material to improve its thermal conductivity.

The first endless belt 120 and the second endless belt 122 may include sidewalls 150. As the first endless belt 120 and the second endless belt 122 are brought together, the sidewalls 150 abut each other to seal the mold cavity 140 closed and prevent the foaming material 142 from leaking from the mold cavity 140.

The fiber reinforcement 148 provides the first endless belt 120 and the second endless belt 122 with enough longitudinal strength to resist breakage due to the stresses imparted during the molding process, moving over the pulleys, and engaging the first plurality of cleats 124 and the second plurality of cleats 126. The fibers may include cotton, aramid, polyester, nylon, carbon fiber, and may include metal threads. Furthermore, the fibers may provide other benefits to the first endless belt 120 and the second endless belt 122 such as improved thermal conductivity.

Improving the thermal conductivity of the first endless belt 120 and the second endless belt 122 may improve its useful life by preventing thermal degradation of the elastomeric material 146 over time. Additionally, cooling the first endless belt 120 and the second endless belt 122 as they return to the input end 104 shown in FIG. 1 may also improve the useful life of the first endless belt 120 and the second endless belt 122.

In some applications of the invention, the first endless belt 120 and the second endless belt 122 may be heated to improve the molding of some foaming materials 142. For example, a thermoset foaming material 142 may cure faster with heat so that by heating the first endless belt 120 and the second endless belt 122 a faster production rate may be achieved. Additionally, thermoplastic foaming material 142 may cool too quickly upon contacting the first endless belt 120 and the second endless belt 122, which may result in an undesirable surface finish such as sharkskin. Heating of the first endless belt 120 and the second endless belt 122 may be provided by warm air or by radiant heat sources known in the art, such as heat lamps.

To help prevent the first endless belt 120 and the second endless belt 122 from deforming under the pressure exerted by the foaming material 142 as they move through the molding section 105, the first plurality of cleats 124 and the second plurality of cleats 126 each respectively engage and support the first endless belt 120 and the second endless belt 122. The first plurality of cleats 124 and the second plurality of cleats 126 may each include a three dimensional abutment surface 152. As the first endless belt 120 and the second endless belt 122 engage the first plurality of cleats 124 and the second plurality of cleats 126, the first endless belt 120 and the second endless belt 122 are pressed into and fully supported by the three dimensional abutment surfaces 152.

A transverse gap 154 may exist between the first plurality of cleats 124 and the second plurality of cleats 126 to prevent the first plurality of cleats 124 and the second plurality of cleats 126 from binding together and to assure that the first endless belt 120 and the second endless belt 122 are closed tightly together. The gap 154 may be about 0.1 inches, but may be larger or smaller depending on the adjustments to the continuous forming apparatus 100.

The first plurality of cleats 124 and the second plurality of cleats 126 may be made of a rigid material such as metal, rubber, ceramic, plastic, or a composite material. Each cleat of the first plurality of cleats 124 and the second plurality of cleats 126 may be made by machining, casting, extrusion, molding, or any other material forming process known in the art.

Each cleat of the first plurality of cleats 124 may be connected together by the first attachment chain 128. Additionally, each cleat of the second plurality of cleats 126 may be connected together by the second attachment chain 130.

The first attachment chain 128 and second attachment chain 130 may include support rollers 156 that engage rails 158 of the first frame 132 and the second frame 134. The rollers 156 and the rails 158 minimize the friction between the moving first plurality of cleats 124 and the moving second plurality of cleats 126 and the stationary first frame 132 and second frame 134. The rails 158 also align the first plurality of cleats 124 with the second plurality of cleats 126. Furthermore, the rails 158 prevent lateral motion of the first plurality of cleats 124 and the second plurality of cleats 126, which may damage a foam product or inadvertently open the mold cavity 140.

FIG. 2 also shows the first plurality of cleats 124, the second plurality of cleats 126, the first endless belt 120, and the second endless belt 122 returning to the input end 104 of the continuous forming machine and positioned outside of the molding section 105.

Figure 3:
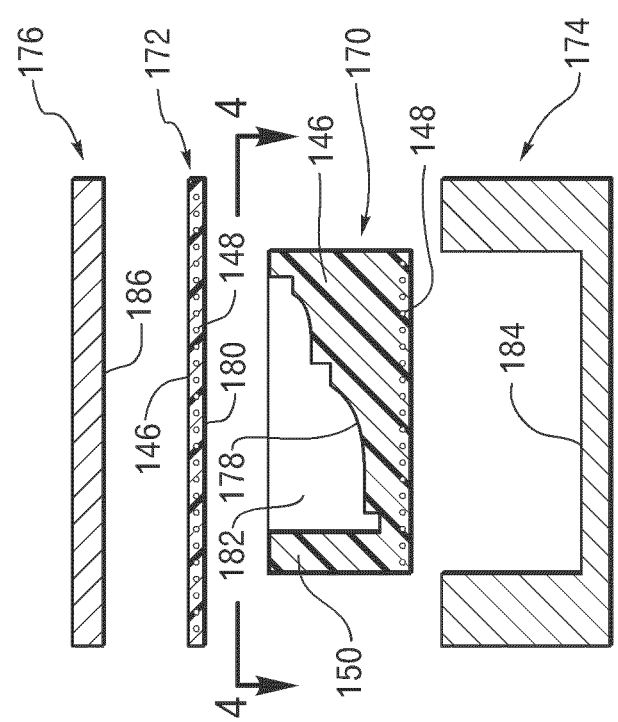
FIG. 3 is an alternative exploded cross sectional view of a cleat of a first plurality of cleats, a cleat of a second plurality of cleats, a first endless belt, and a second endless belt that may be used with the continuous forming apparatus of FIG. 1 taken along line 2-2.

Referring to FIG. 3, an exploded cross sectional view of FIG. 1 taken along line 2-2 illustrates an alternative first endless belt 170, a second endless belt 172, and a first plurality of cleats 174, a second plurality of cleats 176 that may be used with the continuous forming apparatus 100. As shown, the first endless belt 170 includes a three dimensional molding surface 178 that may include curves and may be used to produce crown molding or other foam product.

The first endless belt 170 also includes sidewalls 150 for engaging and sealing against the second endless belt 172.

The first endless belt 170 and the second endless belt 172 may be made of an elastomeric material 146 that permits the first endless belt 170 and the second endless belt 172 to round the pulleys 136 of FIG. 1 without cracking and breaking. The first endless belt 170 and the second endless belt 172 may also includes fiber reinforcement 148 for providing the longitudinal strength that permits the first endless belt 170 and the second endless belt 172 to experience the longitudinal stresses of being pulled around the continuous forming apparatus 100.

The second endless belt 172 may include a flat molding surface 180 that closes a mold cavity 182 formed by the first endless belt 170. In this configuration, the mold features are mostly determined by the first endless belt 170 which may provide some cost savings to manufacturers by requiring a change of only the first endless belt 170 to change the profile of the mold cavity 182.

The first plurality of cleats 174 may include a three-dimensional abutment surface 184 that engages and supports the first endless belt 170 against the second endless belt 172. The second plurality of cleats 176 may include a flat abutment surface 186 that engages and supports the second endless belt 172 against the first endless belt 170.

Figure 4:
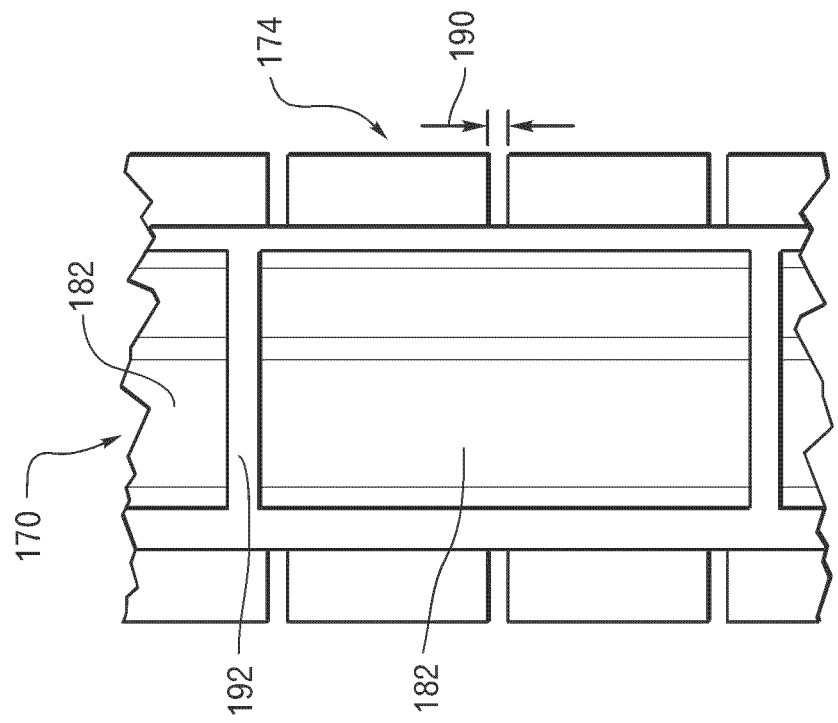
FIG. 4 is a view of the first endless mold belt surface of FIG. 3 along line 4-4 as supported by a first plurality of cleats.

FIG. 4 is a top view of FIG. 3 along line 4-4 that illustrates the first endless belt 170 and the first plurality of cleats 174. As shown, the first plurality of cleats 174 has engaged and is supporting the first endless belt 170.

The cleats of the first plurality of cleats 174 may be spaced from each other by a longitudinal gap 190. The longitudinal gap 190 may range from about an inch or more to almost abutting an adjacent cleat, but may preferably be about 0.1 inches which may be large enough to prevent the first plurality of cleats 174 from binding together as they move over the continuous forming apparatus. Additionally, the gap 190 may be small enough that the first endless belt 170 does not deform in the gap 190 sufficiently to significantly affect the profile of the mold cavity 182.

As shown, the first endless belt 170 includes discrete mold cavities 182 that are separated by a mold wall 192 of the first endless belt 170. The mold wall 192 separates the discrete mold cavities 182 and may assist in removing a foam product from a mold cavity 192.

Figure 5:
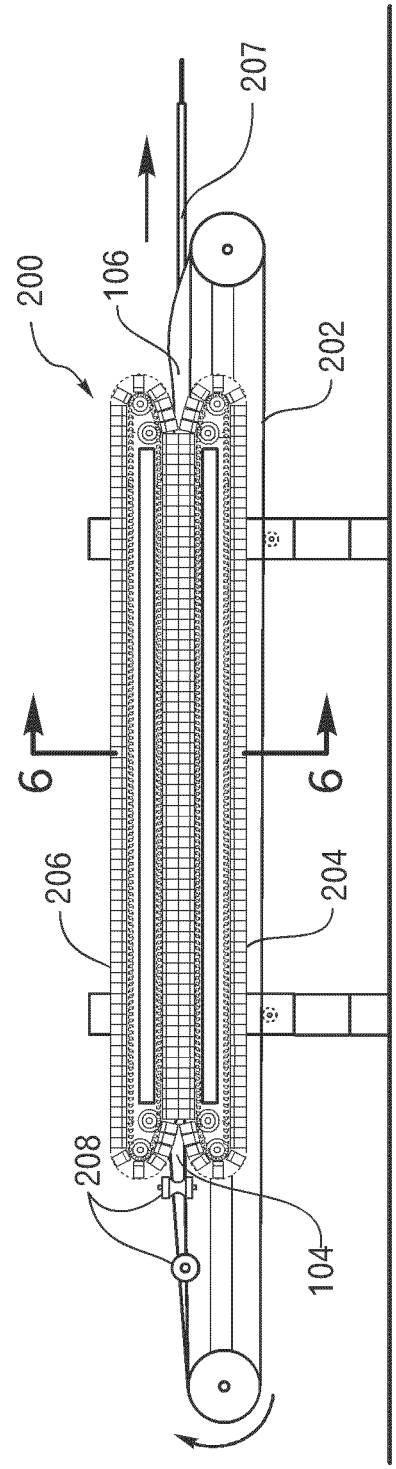
FIG. 5 is an elevated side view of another continuous forming apparatus within the scope of the invention.

FIG. 5 is an elevated side view of another continuous forming apparatus 200 according to the invention. As shown, the continuous forming apparatus 200 is similar to the continuous forming apparatus 100 of FIG. 1 but includes a single endless belt 202 that is engaged and supported by a first plurality of cleats 204 and a second plurality of cleats 206. Furthermore, the continuous forming apparatus 200 may also include positioning rollers 208 that help form the endless belt 202 so that it may engage and be supported by both the first plurality of cleats 204 and a second plurality of cleats 206.

A foam product 207 is also shown exiting the output end 106 of the continuous forming apparatus 200.

FIG. 6 is a cross sectional view of the continuous forming apparatus 200 of FIG. 5 along line 6-6 that further illustrates how the endless belt 202 engages and may be supported by both the first plurality of cleats 204 and the second plurality of cleats 206. Specifically, the endless belt 202 has a flat molding surface 208 and a length 210 that is sufficient to permit the endless belt 202 to be rolled into a circular configuration where a first side edge 212 of the endless belt 202 contacts and seals against a second side edge 214 of the endless belt 202. Of course, other cross sectional shapes besides circles may be formed, such as ovals and polygons.

When the endless belt 202 engages the first plurality of cleats 204 and the second plurality of cleats 206, the first side edge 212 and the second side edge 214 are positioned away from the transverse gap 154 and adjacent to one of the curved three dimensional abutment surfaces 216 of the first plurality of cleats 204 and the second plurality of cleats 206. The curved three dimensional abutment surfaces 216 provide support to the endless belt 202 in both lateral direction 138 and the transverse direction 114. Similarly, the endless belt 202 supports a foaming material 218 in both lateral direction 138 and the transverse direction 114.

Once the foaming material 218 is molded into the foam product 207 shown in FIG. 5, the endless belt 202 may be flattened and returned to the input end 104 of the continuous forming apparatus 200 of FIG. 5 where it is re-rolled and reengages the first plurality of cleats 204 and the second plurality of cleats 206.

Figure 8:
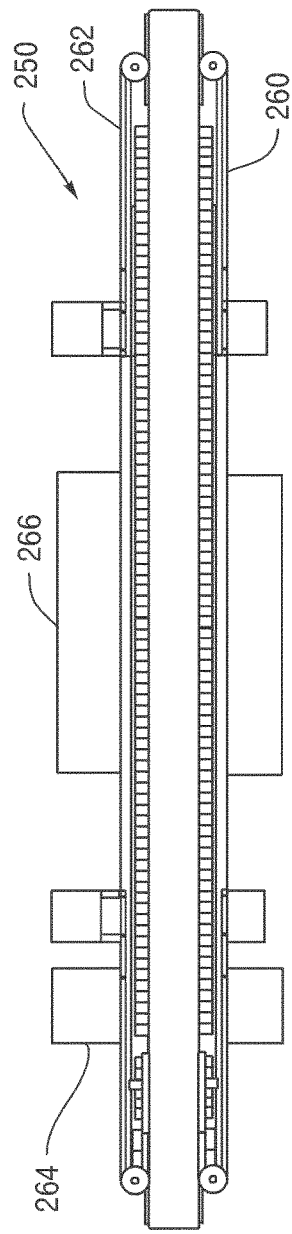
FIG. 8 is a top view of the continuous forming apparatus of FIG. 7.
Figure 7:
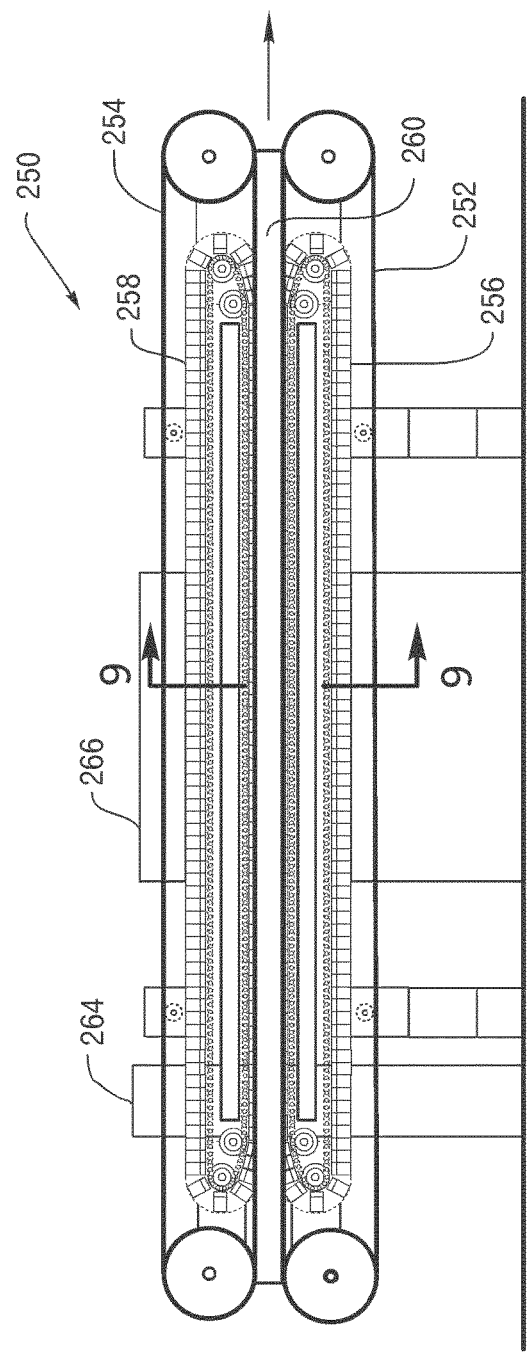
FIG. 7 is an elevated side view of an alternative continuous forming apparatus according to the invention.

FIG. 7 is an elevated side view and FIG. 8 is a top view of an alternative continuous forming apparatus 250 according to the invention. As shown in FIGS. 7 and 8, the continuous forming apparatus 250 is similar to the continuous forming apparatus 100 of FIG. 1 and includes a first endless belt 252, a second endless belt 254, a first plurality of cleats 256, and a second plurality of cleats 258.

However, the continuous forming apparatus 250 may also include a third endless belt 260 and a fourth endless belt 262 that is opposed to the third endless belt 260. The third endless belt 260 and the fourth endless belt 262 may be disposed substantially orthogonal to the first endless belt 252 and a second endless belt 254.

Additionally, the continuous forming apparatus 250 may also include a mold release application device 264. The mold release application device 264 may mist, spray, brush, or in any other manner known in the art apply a mold release agent to the first endless belt 252, the second endless belt 254, the third endless belt 260, and the fourth endless belt 262.

Furthermore, the continuous forming apparatus 250 may include a temperature control system 266. The temperature control system 266 may be used to preheat the first endless belt 252, the second endless belt 254, the third endless belt 260, and the fourth endless belt 262 in preparation for molding foaming material with the continuous forming apparatus 250. The temperature control system 266 may also be used to control the temperature of the first endless belt 252, the second endless belt 254, the third endless belt 260, and the fourth endless belt 262 while the continuous forming apparatus 250 is in operation.

The temperature control system 266 may include heated air, heat lamps, or other sources of radiant energy for heating the first endless belt 252, the second endless belt 254, the third endless belt 260, and the fourth endless belt 262. Additionally, the temperature control system 266 may include fans, air conditioners, and evaporative coolers for providing cool air flow to cool the first endless belt 252, the second endless belt 254, the third endless belt 260, and the fourth endless belt 262. The temperature control system 266 may also include nozzles for spraying or misting a coolant, such as water, onto the first endless belt 252, the second endless belt 254, the third endless belt 260, and the fourth endless belt 262.

FIG. 9 is a cross sectional view of the continuous forming apparatus 250 of FIG. 7 along line 9-9. As shown, the first endless belt 252, the second endless belt 254, the third endless belt 260, and the fourth endless belt 262 cooperate to define a mold cavity 270 for molding the foaming material 272. The first endless belt 252, the second endless belt 254, the third endless belt 260, and the fourth endless belt 262 include flat molding surfaces 274 used to support the foaming material 272 on one side.

By using four endless belts 252, 254, 260, and 262, the thickness of the endless belts 252, 254, 260, and 262 is kept to a minimum which reduces the stress that the endless belts 252, 254, 260, and 262 undergo as they wrap around the pulleys of the continuous forming apparatus 250. By reducing the stresses on the endless belts 252, 254, 260, and 262, the useful life of the endless belts 252, 254, 260, and 262 may be extended. Additionally, the endless belts 252, 254, 260, and 262 may be made of other materials than elastomers, such as metals, polymers, composites, and fabrics. Furthermore, by using four endless belts 252, 254, 260, and 262, larger profiles of the mold cavity 270 are possible than using two endless belts incorporating sidewalls.

The first plurality of cleats 256 and the second plurality of cleats 258 each include a three dimensional abutment surface 278 for abutting and supporting the first endless belt 252, the second endless belt 254, the third endless belt 260, and the fourth endless belt 262. As shown, the first plurality of cleats 256 and the second plurality of cleats 258 mirror and oppose each other in supporting the mold cavity 270. Because the first plurality of cleats 256 and the second plurality of cleats 258 include a three dimensional abutment surface 278, the first plurality of cleats 256 and the second plurality of cleats 258 are able to provide support in the lateral 138 and transverse 114 directions.

FIG. 10 is an alternative cross sectional view taken along line 9-9 of FIG. 7 illustrating a first plurality of cleats 280, a second plurality of cleats 282, a first endless belt 284, a second endless belt 286, a third endless belt 288, and a fourth endless belt 290 that may be used with the continuous forming apparatus 250. As shown, the first endless belt 284, the second endless belt 286, the third endless belt 288, and the fourth endless belt 290 may include flat molding surfaces 292. The first endless belt 284 and the second endless belt 286 may also include separation features 294 for facilitating the separation of a foam product into discrete foam products.

Additionally, the first plurality of cleats 280 and a second plurality of cleats 282 include three dimensional abutment surfaces 296. The three dimensional abutment surfaces 296 permit the first plurality of cleats 280 to contact and support the first endless belt 284, the third endless belt 288, and the fourth endless belt 290, while the second plurality of cleats 282 contacts and supports the second endless belt 286 in the lateral 138 and transverse 114 directions.

In this configuration, the first plurality of cleats 280 defines a majority of the mold cavity 270. Thus, only the first plurality of cleats 280 may need to be changed in order to change the profile of the mold cavity 270.

FIG. 11 is a cross sectional view of FIG. 10 along line 11-11 and illustrates the positioning of the separation features 294 on the first endless belt 284. The separation features 294 form holes in a foam product which weakens the foam product at the location of the separation features 294, permitting the foam product to be selectively broken at the separation features 294.

FIG. 12 is an elevated side view of an alternative continuous forming apparatus 300 according to the invention. As shown, the continuous forming apparatus 300 is similar to the continuous forming apparatus 250 of FIGS. 7 and 8 and includes a first endless belt 302, a second endless belt 304, a third endless belt 306, a fourth endless belt 308 (shown in FIG. 13), a first plurality of cleats 310, a second plurality of cleats 312, a first frame 314, and a second frame 316. The continuous forming apparatus 300 may also include a third plurality of cleats 318 and a fourth plurality of cleats 320 (shown in FIG. 13).

FIG. 13 is a top view of the continuous forming apparatus 300 of FIG. 12 with the second endless belt 304 and second plurality of cleats 312 removed to more clearly show the third plurality of cleats 318 and the fourth plurality of cleats 320. The continuous forming apparatus 300 may also include a third frame 322 and a fourth frame 324 for respectively supporting the third plurality of cleats 318 and the fourth plurality of cleats 320 in molding a foaming material.

Figure 14:
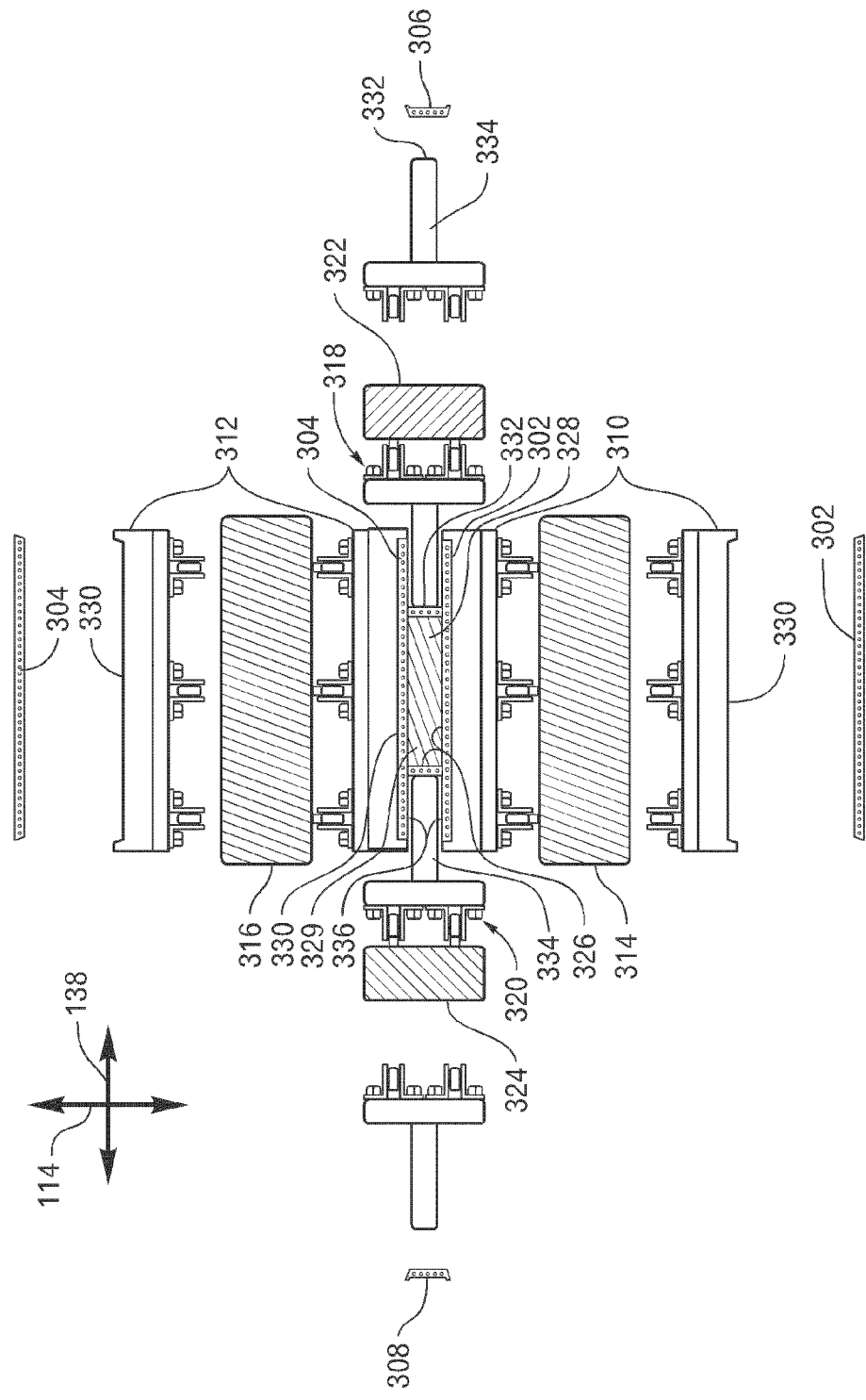
FIG. 14 is a cross sectional view of the continuous forming apparatus of FIG. 12 along line 14-14.

FIG. 14 is a cross sectional view along line 14-14 of the continuous forming apparatus 300 of FIG. 12. As shown, the first endless belt 302, the second endless belt 304, the third endless belt 306, and the fourth endless belt 308 include flat molding surfaces 326 used to define a mold cavity 328 and mold the foaming material 329. As the endless belts 302, 304, 306, 308 are brought together to form the mold cavity 328, the third endless belt 306 and the fourth endless belt 308 are slightly compressed edgewise by the first endless belt 302 and the second endless belt 304 to create a seal between endless belts 302, 304, 306, 308 and thereby prevent the escape of expanding foaming material 329.

The first plurality of cleats 310 and the second plurality of cleats 312 may include a three dimensional abutment surface 330. The abutment surfaces 330 of the first plurality of cleats 310 contacts and the second plurality of cleats 312 provides support to the first endless belt 302 and the second endless belt 304 in the lateral 138 and transverse 114 directions.

The third plurality of cleats 318 and the fourth plurality of cleats 320 may both include a flat abutment surface 332 and a neck 334 that disposes to engage and support the third endless belt 306 and the fourth endless belt 308 respectively. The neck 334 is narrow so that it may extend between the first endless belt 302 and the second endless belt 304 while providing transverse gaps 336 between the neck and the first endless belt 302 and the second endless belt 304. The transverse gaps 336 help to prevent the third plurality of cleats 318 and the fourth plurality of cleats 320 from binding with the first endless belt 302 and the second endless belt 304.

This configuration may be used to produce large profiled foam product or products that require relatively long processing lengths. An added advantage of this configuration is that the distance between the third endless belt 306, the fourth endless belt 308, the third plurality of cleats 318, the fourth plurality of cleats 320, the third frame 322, and the fourth frame 324 may be adjusted, which allows the same equipment to produce profiles of common depth but varying widths. For example, if synthetic lumber were being produced, the same continuous forming apparatus may be used to produce synthetic lumber in 2×2, 2×4, 2×6, 2×8, 2×10 sizes with relatively minor adjustments to the continuous forming apparatus.

Each plurality of cleats 310, 312, 318, 320 may be moved or driven at the same speed. The third plurality of cleats 318 and fourth plurality of cleats 320 may be unpowered and idle, relying on the first plurality of cleats 310 and the second plurality of cleats 312 and mold friction to drag them along at the needed speed.

Figure 15:
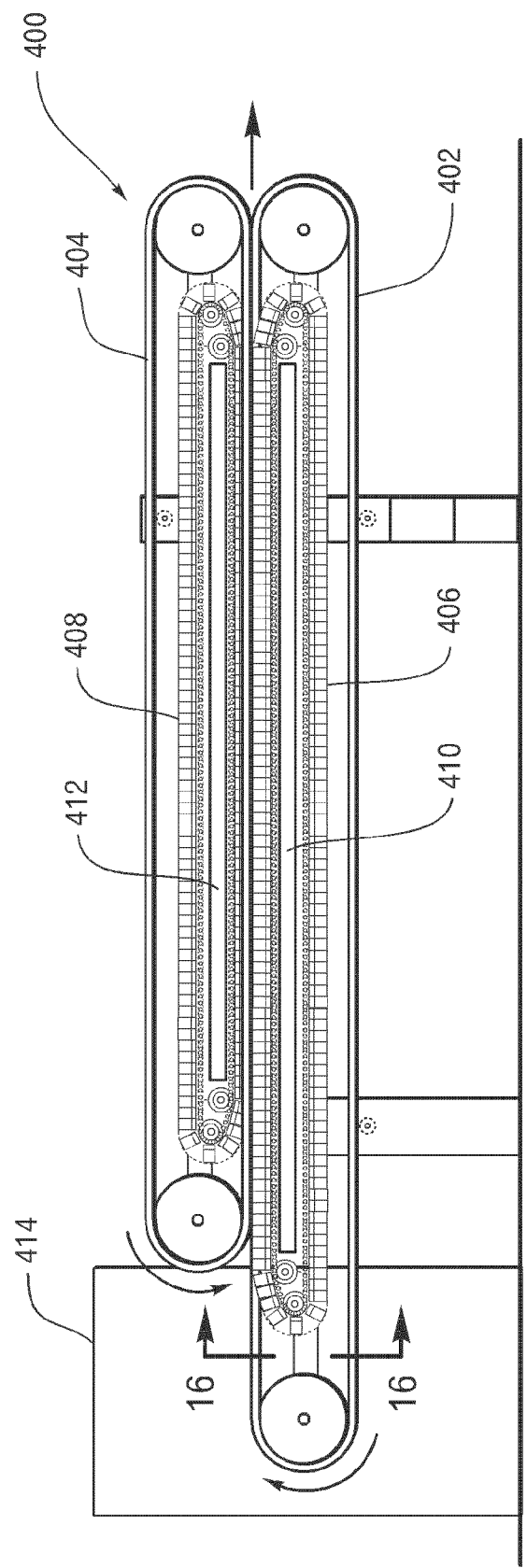
FIG. 15 is an elevated side view of another continuous forming apparatus according to the invention.

FIG. 15 is an elevated side view of another continuous forming apparatus 400 according to the invention. As shown, the continuous forming apparatus 400 is similar to the continuous forming apparatus 100 of FIG. 1 and includes a first endless belt 402, a second endless belt 404, a first plurality of cleats 406, a second plurality of cleats 408, a first frame 410, and a second frame 412. However, the first endless belt 402, the first plurality of cleats 406 and the first frame 410 are longer than the second endless belt 404, the second plurality of cleats 408, and the second frame 412. Additionally, the continuous forming apparatus 400 includes an insert placing means 414.

The difference in length between the first endless belt 402 and the second endless belt 404 permits the insert placing means 414 to place inserts on the first endless belt 402. Before the first endless belt 402 engages the second endless belt 404, the inserts are disposed within a closed mold cavity of the continuous forming apparatus 400. Inserts may include electrical wiring, threaded connectors, reinforcements, fasteners, and other items known in the art that may be molded into a product. The insert placing means 414 may be a person placing inserts by hand or an automated machine.

Figure 16:
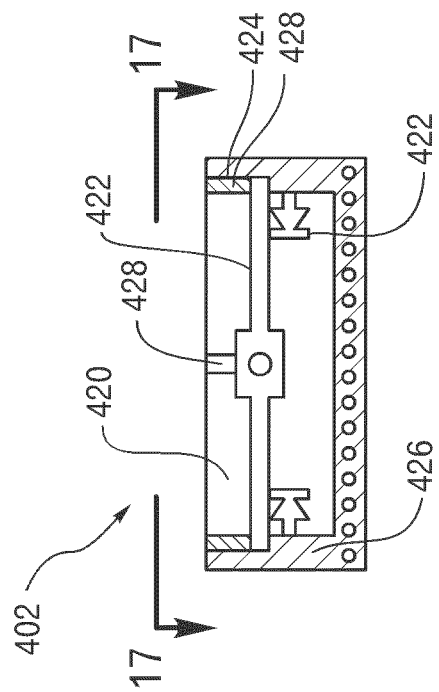
FIG. 16 is a cross sectional view of the mold belt of FIG. 15 along line 16-16.

FIG. 16 is a cross sectional view of the first endless mold belt 402 of forming apparatus 400 of FIG. 15 along line 16-16 that illustrates the first endless belt 402 as including a mold cavity 420. As shown, inserts 422 disposed within a mold cavity of the first endless belt 402. Additionally, slots 424 may be positioned in the wall 426 of the first endless belt 402 in order to support and position the inserts 422 within the mold cavity 420. Mold slot covers 428 may be used to prevent foaming material from contacting portions of the inserts 422 that extend into the slots 424 and are to extend from the finished foam product.

Figure 17:
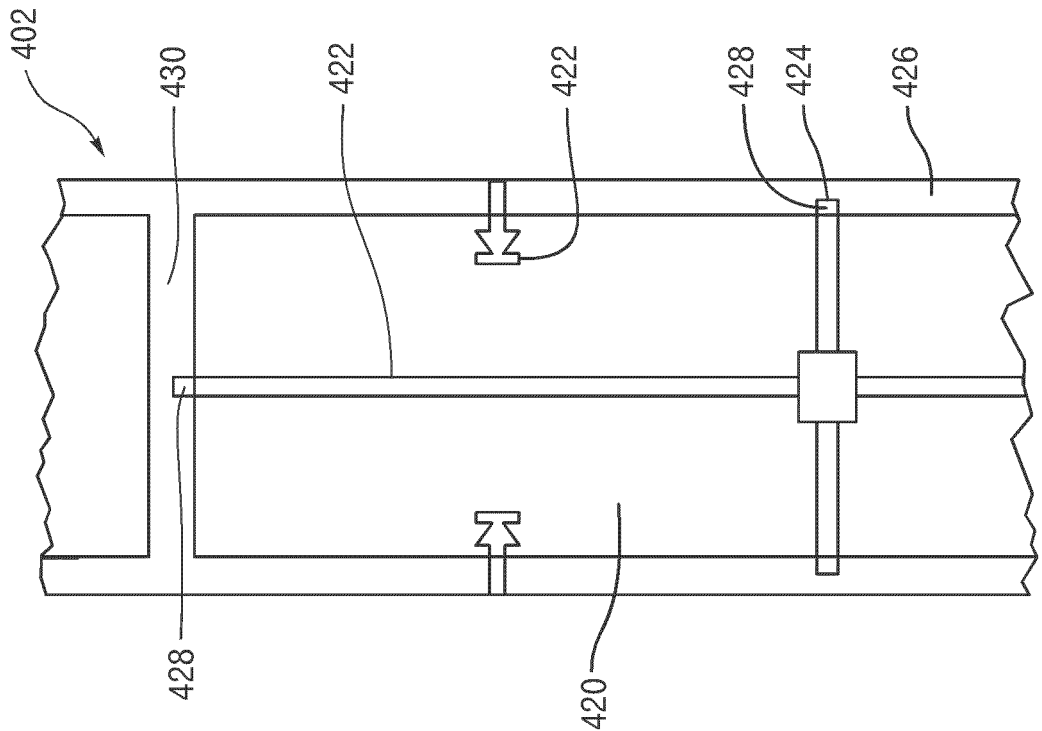
FIG. 17 is a top view of the cross sectional view of FIG. 16 along line 17-17.

FIG. 17 is a top view of the cross sectional view of FIG. 16 along line 17-17. As shown, inserts 422 are disposed within the mold cavity 420 of the first endless belt 402. The inserts 422 extend into the slots 424 in the wall 426. The slots 424 are filled by the mold slot covers 428. Additionally, the first endless belt 402 includes a mold wall 430 for separating the first endless belt 402 into discrete mold cavities 420 for making discrete products.

Figure 18:
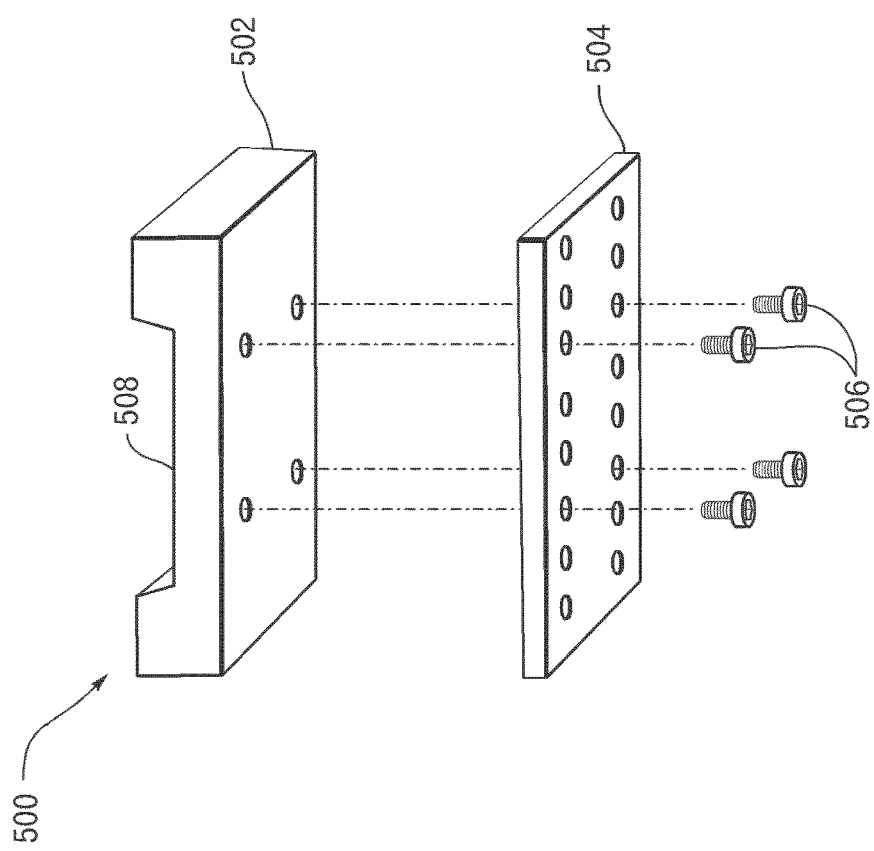
FIG. 18 is an exploded view of a cleat according to the invention.

FIG. 18 is an exploded view of a cleat 500 of the invention. The cleat 500 may include a mold support portion 502, a base portion 504, and an attachment mechanism 506. The mold support portion 502 includes an abutment surface 508 for engaging and supporting an endless belt.

The base portion 504 is removably attachable to the mold support portion 502 by the attachment mechanism 506. This permits the mold support portion 502 to be quickly and efficiently changed while leaving the base portion 504 attached to an attachment chain. Thus, a mold support portion 502 having a curved abutment surface 508 may be changed to an abutment surface 508 having flat surfaces and corners.

The attachment mechanism 506 may include threaded fasteners, clips, tongue and groove features, or other mechanical fasteners known in the art. Of course, the base portion 504 and the mold support portion 502 may be integrally formed or welded together so that the attachment mechanism 506 is no longer needed.

In conclusion, various configurations of continuous forming apparatus according to the invention have been disclosed. A continuous forming apparatus may be used in the production of a variety of foam products including, but not limited to synthetic lumber, roofing, siding, interior molding & trim, panels, fencing, doors, window blind slats, etc. Furthermore, a continuous forming apparatus may be used to process foam thermoplastics, foam thermoset plastics, foam ceramic or concrete materials, foam ceramic/plastic blends, and composites.

Generally, a continuous forming apparatus may include one or more endless belts and a plurality of cleats for supporting the endless belts and reducing the friction that results from operating the continuous forming apparatus. The endless belts help to define a product's shape and texture. Additionally, the endless belts may incorporate localized features, such as pockets, ridges, knobs, clips, brackets, etc., in the mold belt cavity may be used to locate and hold inserts in position that will be cast or molded into the product. The inserts may be embedded into the product for reinforcement, thread attachment, handles, hard points, wear plates, internal conduit or plumbing, electrical wiring, or any such characteristic that might enhance product performance or eliminate subsequent assembly.

Conventional laminated conveyor belts may be used as endless belts. Endless belts requiring greater thickness may be fabricated by casting a rubber mold face onto an existing belt or fabric-reinforced carcass. Thicker endless belts may also have the mold surface or product-molding cavity machined or otherwise carved into the belt face. Release films or layers at the outer surfaces of the belts may also be incorporated into mold belts to facilitate release from the formed product.

The cleats used in the continuous forming apparatus may be made of nearly any rigid or semi-rigid material such as metal, plastic, rubber, composite, ceramic, or a combination thereof. The cleats may incorporate a base that stays attached to the chain and an easily removable cleat profile to facilitate changes in profile and product size. The cleat profiles may include a radius, angle, or other feature on its abutment surface to allow an endless belt to easily center itself within the cleat. For example, the cleats 124, 126 and endless belts 120, 122 shown in FIG. 2 share angled sides that are wider at the opening to help the endless belts 120, 122 center and nest themselves into the cleats 124, 126. Additionally, the profiles of opposed cleats may vary greatly depending on the shape of the product and how the manufacturer prefers to divide the overall cavity. Furthermore, the cleats may be machined, molded, cast, extruded, or a combination thereof out of metal, plastic, rubber, composite, ceramic, or a combination of materials.

The use of high-strength chains and sprockets allow considerable pulling force to be used in driving the continuous forming apparatus in the direction of production. Furthermore, the rolling elements of the attachment chains contacting the rigid rails of the frames minimize friction within the continuous forming apparatus and allow longer and wider belts to be driven and larger products processed. Additionally, the length of a continuous forming apparatus according to the invention should be long enough, and/or speed of the endless belts and pluralities of cleats slow enough, to assure that the foaming material is sufficiently cooled and/or cured to maintain the desired shape of the foam product when exiting the continuous forming apparatus.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A method of forming molded foam materials using a continuous forming apparatus comprising the steps of:
   providing a continuous forming apparatus comprising:
      a first endless belt comprising an inner surface and an outer surface;
      a second endless belt comprising an inner surface and an outer surface, the inner surfaces of the first and second endless belts comprising a mold cavity,
      a first plurality of cleats,
      a first linked chain belt connecting the first plurality of cleats together;
      a second plurality of cleats opposed to the first plurality of cleats; and
      a second linked chain belt connecting the second plurality of cleats together,
         wherein the first and second plurality of cleats comprise an abutment surface to provide support to the first and second endless belts, whereby the mold cavity is pressure resistant,
         wherein the first and second plurality of cleats each comprise endless loops wherein the cleats comprise a plurality of separate sections mounted close to one another on the respective first linked chain belt and second linked chain belt so that the longitudinal gap between adjacent sections is about 0.1 inches, wherein a transverse gap disposed between the first plurality of cleats and the second plurality of cleats is about 0.1 inches, wherein the first and second plurality of cleats each form a relatively continuous support surface for the first and second endless belts;
   supporting the first linked chain belt using a first rigid support surface;
   supporting the second linked chain belt using a second rigid support surface;
   reducing frictional forces between the first linked chain belt and the first rigid support surface and the second linked chain belt and the second rigid support surface by coupling rollers to the first and second linked chain belts;
   introducing a composite material into the mold cavity, wherein the mold cavity is pressure resistant;
   moving the composite material in a plane substantially parallel to the inner surface of the first endless belt; and
   curing the composite material to form a molded foam material.

2. A method according to claim 1, wherein the second endless belt that cooperates with the first endless belt to mold the foam material, wherein the second endless belt is supported by the second plurality of cleats.

3. A method according to claim 2, wherein the second plurality of cleats comprise a three-dimensional abutment surface to provide transverse and lateral support to the second endless belt.

4. A method according to claim 2, further comprising a third endless belt and a fourth endless belt that cooperates with the first endless belt and the second endless belt to mold the foam material.

5. A method according to claim 1, wherein the continuous forming apparatus further comprises a third plurality of cleats and a fourth plurality of cleats disposed generally orthogonal to the first plurality of cleats and the second plurality of cleats.

6. A method according to claim 1, wherein the first endless belt of the continuous forming apparatus comprises an insert support feature.

7. A method according to claim 1, wherein the first endless belt comprises a mold cavity for molding a discrete foam part.

8. A method according to claim 1, wherein the continuous forming apparatus further comprises a first frame disposed to support the first plurality of cleats and a second frame disposed to support the second plurality of cleats.

9. A method according to claim 1, wherein the first endless belt is supported by the first plurality of cleats to form a curved cross sectional area for molding foam material.

10. A method according to claim 9, wherein the first endless belt is also supported by the second plurality of cleats to form a circular cross sectional area for molding foam material.

11. A method according to claim 1, wherein a lateral gap is disposed between each cleat of the first plurality of cleats.

12. A method according to claim 1, wherein the transverse gap disposed between the first plurality of cleats and the second plurality of cleats is about 0.1 inches.

13. A method according to claim 2, wherein the second plurality of cleats comprise a flat abutment surface to provide transverse and lateral support to the second endless belt.

14. A method according to claim 2, wherein the first endless belt and second endless belt do not separate under the pressure of the foamed material during molding.

15. A method according to claim 2, wherein there is a difference in length between the first endless belt and the second endless belt.

16. A method according to claim 1, further comprising inserts on the first endless belt within the mold cavity, wherein the inserts are selected from the group consisting of electrical wiring, threaded connectors, reinforcements, and fasteners.

17. A method of forming molded foam materials using a continuous forming apparatus comprising the steps of:
providing a continuous forming apparatus comprising:
a first endless belt comprising an inner surface and an outer surface;
a second endless belt comprising an inner surface and an outer surface, the inner surfaces of the first and second endless belts comprising a mold cavity,
a first plurality of cleats,
a third endless belt connecting the first plurality of cleats together;
a second plurality of cleats opposed to the first plurality of cleats; and
a fourth endless belt connecting the second plurality of cleats together,
wherein the first and second plurality of cleats comprise an abutment surface to provide support to the first and second endless belts, whereby the mold cavity is pressure resistant,
wherein the first and second plurality of cleats each comprise endless loops wherein the cleats comprise a plurality of separate sections mounted close to one another on the respective third and fourth endless belts so that the longitudinal gap between adjacent sections is about 0.1 inches, wherein a transverse gap between the first plurality of cleats and the second plurality of cleats is about 0.1 inches, wherein the first and second plurality of cleats each form a relatively continuous support surface for the first and second endless belts;
supporting the third endless belt using a first rigid support surface;
supporting the fourth endless belt using a second rigid support surface;
introducing a composite material into the mold cavity, wherein the mold cavity is pressure resistant;
moving the composite material in a plane substantially parallel to the inner surface of the first endless belt; and
curing the composite material to form a molded foam material.

18. The method of claim 17 wherein the third and fourth endless belts comprise linked chain belts on which the respective first and second plurality of cleats are mounted, wherein the linked chain belts hold the cleats in spaced apart relation so that the longitudinal gap between adjacent cleat sections is maintained.

19. The method of claim 18 wherein the longitudinal gap and the transverse gap are greater than 0.1 inches.

* * * * *